(12) United States Patent
Park et al.

(10) Patent No.: US 12,279,256 B2
(45) Date of Patent: Apr. 15, 2025

(54) METHOD AND APPARATUS FOR TRANSMITTING DATA FOR WIRELESS COMMUNICATION

(71) Applicant: Samsung Electronics Co., Ltd., Suwon-si (KR)

(72) Inventors: Sungjin Park, Suwon-si (KR); Jinhyun Park, Suwon-si (KR); Jinyoung Oh, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 17/765,818

(22) PCT Filed: Sep. 29, 2020

(86) PCT No.: PCT/KR2020/013364
§ 371 (c)(1),
(2) Date: Mar. 31, 2022

(87) PCT Pub. No.: WO2021/066536
PCT Pub. Date: Apr. 8, 2021

(65) Prior Publication Data
US 2022/0394743 A1   Dec. 8, 2022

(30) Foreign Application Priority Data

Oct. 4, 2019   (KR) .................. 10-2019-0122802

(51) Int. Cl.
*H04W 72/12*   (2023.01)
*H04L 1/00*   (2006.01)
(Continued)

(52) U.S. Cl.
CPC ....... *H04W 72/1273* (2013.01); *H04L 1/0067* (2013.01); *H04L 5/0051* (2013.01); *H04W 72/23* (2023.01)

(58) Field of Classification Search
CPC .............. H04W 72/1273; H04W 72/23; H04L 1/0067; H04L 5/0051
See application file for complete search history.

(56) References Cited

U.S. PATENT DOCUMENTS

2018/0287734 A1*  10/2018  Lee .................. H04L 1/0067
2019/0045490 A1*   2/2019  Davydov ............. H04L 5/0044
(Continued)

FOREIGN PATENT DOCUMENTS

KR   10-2020-0114988 A   10/2020
KR   10-2021-0033370 A    3/2021

OTHER PUBLICATIONS

International Search Report and Written Opinion of the International Searching Authority dated Jan. 20, 2021, in connection with International Application No. PCT/KR2020/013364, 11 pages.
(Continued)

*Primary Examiner* — Brenda H Pham

(57) ABSTRACT

The present disclosure relates to a communication technique for combining an IoT technology with a 5G communication system for supporting a higher data transmission rate than a 4G system, and a system therefor. The present disclosure can be applied to intelligent services (for example, smart homes, smart buildings, smart cities, smart cars or connected cars, health care, digital education, retail business, security and safety-related services, and the like) on the basis of 5G communication technologies and IoT-related technologies. A method for a terminal in a wireless communication system, according to the present disclosure, comprises the steps of: receiving a control signal; determining, from the control signal, a resource to which data can be mapped and then transmitted/received; and receiving data according to the determined resource for the data.

16 Claims, 24 Drawing Sheets

(51) Int. Cl.
*H04L 5/00* (2006.01)
*H04W 72/1273* (2023.01)
*H04W 72/23* (2023.01)

(56) References Cited

U.S. PATENT DOCUMENTS

| | | | |
|---|---|---|---|
| 2019/0261327 A1* | 8/2019 | Hosseini | H04W 72/23 |
| 2019/0296876 A1 | 9/2019 | Zhang et al. | |
| 2020/0204301 A1* | 6/2020 | Wu | H03M 13/618 |
| 2022/0029737 A1 | 1/2022 | Park et al. | |

OTHER PUBLICATIONS

Oppo, "Enhancements on multi-TRP and multi-panel transmission," R1-1908351, 3GPP TSG RAN WG1 Meeting #98, Prague, CZ, Aug. 26-30, 2019, 13 pages.

Qualcomm Incorporated, "Multi-TRP Enhancements," R1-1909272, 3GPP TSG-RAN WG1 Meeting #98, Prague, Czech Republic, Aug. 26-30, 2019, 32 pages.

Qualcomm Incorporated, "Multi-TRP Enhancements," R1-1900905, 3GPP TSG-RAN WG1 Meeting AH-1901, Taipei, Taiwan, Jan. 21-25, 2019, 26 pages.

Nokia et al., "Summary of offline on maintenance related to rate-matching in NR", 3GPP TSG-RAN WG1 #94, May 21-25, 2018, R1-1809846, 15 pages.

Supplementary European Search Report dated Sep. 30, 2022 in connection with European Patent Application No. 20 87 2184, 10 pages.

Office Action dated Feb. 11, 2025, in connection with Korean Application No. 10-2019-0122802, 7 pages.

3GPP TS 38.214 V15.7.0 (Sep. 2019), Technical Specification, 3rd Generation Partnership Project; Technical Specification Group Radio Access Network; NR; Physical layer procedures for data (Release 15), Sep. 2019, 106 pages.

* cited by examiner

METHOD AND APPARATUS FOR TRANSMITTING DATA FOR WIRELESS COMMUNICATION

CROSS-REFERENCE TO RELATED APPLICATIONS

This application is a 371 National Stage of International Application No. PCT/KR2020/013364, filed Sep. 29, 2020, which claims priority to Korean Patent Application No. 10-2019-0122802, filed Oct. 4, 2019, the disclosures of which are herein incorporated by reference in their entirety.

BACKGROUND

1. Field

The disclosure relates to a wireless communication system and, more particularly, to a method and an apparatus for transmitting/receiving data in a wireless communication system.

2. Description of Related Art

To meet the demand for wireless data traffic having explosively increased since deployment of 4G communication systems and increases of multimedia services, efforts have been made to develop an improved 5G or pre-5G communication system. Therefore, the 5G or pre-5G communication system is also called a "Beyond 4G Network" communication system or a "Post LTE" system. The 5G communication system is considered to be implemented in ultra-higher frequency (mmWave) bands (e.g., 60 GHz bands) so as to increase data rates. To decrease propagation loss of the radio waves and increase the transmission distance in the ultra-higher frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

As described above, in line with development of wireless communication systems, there is a need for a data transmission/reception scheme for network cooperative communication.

SUMMARY

There is a need for a scheme for efficiently performing data transmission/reception in connection with network cooperative communication. Particularly, the disclosure provides a method and an apparatus for applying rate matching when data is transmitted/received.

In order to solve the above-mentioned problems, the disclosure provides a method performed a terminal in a communication system, the method including: receiving information indicating whether a first scheme for rate matching is performed; receiving first rate matching resource information and second rate matching resource information via higher layer signaling; and receiving a first physical downlink shared channel (PDSCH) and a second PDSCH, wherein in case that the first scheme is performed based on the information, a resource indicated by the first rate matching resource information is not used to receive the first PDSCH, and a resource indicated by the second rate matching resource information is not used to receive the second PDSCH.

In addition, the disclosure provides a method performed by a base station of a communication system, the method including: transmitting information indicating whether a first scheme for rate matching is performed; transmitting first rate matching resource information and second rate matching resource information via higher layer signaling; in case that the first scheme is performed based on the information, transmitting a first physical downlink shared channel (PDSCH) in a resource excluding the resource indicated by the first rate matching resource information; and transmitting a second PDSCH in a resource excluding the resource indicated by the second rate matching resource information.

In addition, the disclosure provides a UE in a communication system, the UE including: a transceiver; and a controller configured to receive information indicating whether a first scheme for rate matching is performed, to receive first rate matching resource information and second rate matching resource information via higher layer signaling, and to receive a first physical downlink shared channel (PDSCH) and a second PDSCH, wherein in case that the first scheme is performed based on the information, a resource indicated by the first rate matching resource information is not used to receive the first PDSCH, and a resource indicated by the second rate matching resource information is not used to receive the second PDSCH.

In addition, the disclosure provides a base station in a communication system, the base station including: a transceiver; and a controller configured to transmit information indicating whether a first scheme for rate matching is performed, to transmit first rate matching resource information and second rate matching resource information via higher layer signaling, in case that the first scheme is performed based on the information, to transmit a first physical downlink shared channel (PDSCH) in a resource excluding the resource indicated by the first rate matching resource information, and to transmit a second PDSCH in a resource excluding the resource indicated by the second rate matching resource information.

According to the disclosure, a baes station may provide efficient data transmission to a UE in a wireless communication system.

DETAILED DESCRIPTION

Figure 1:
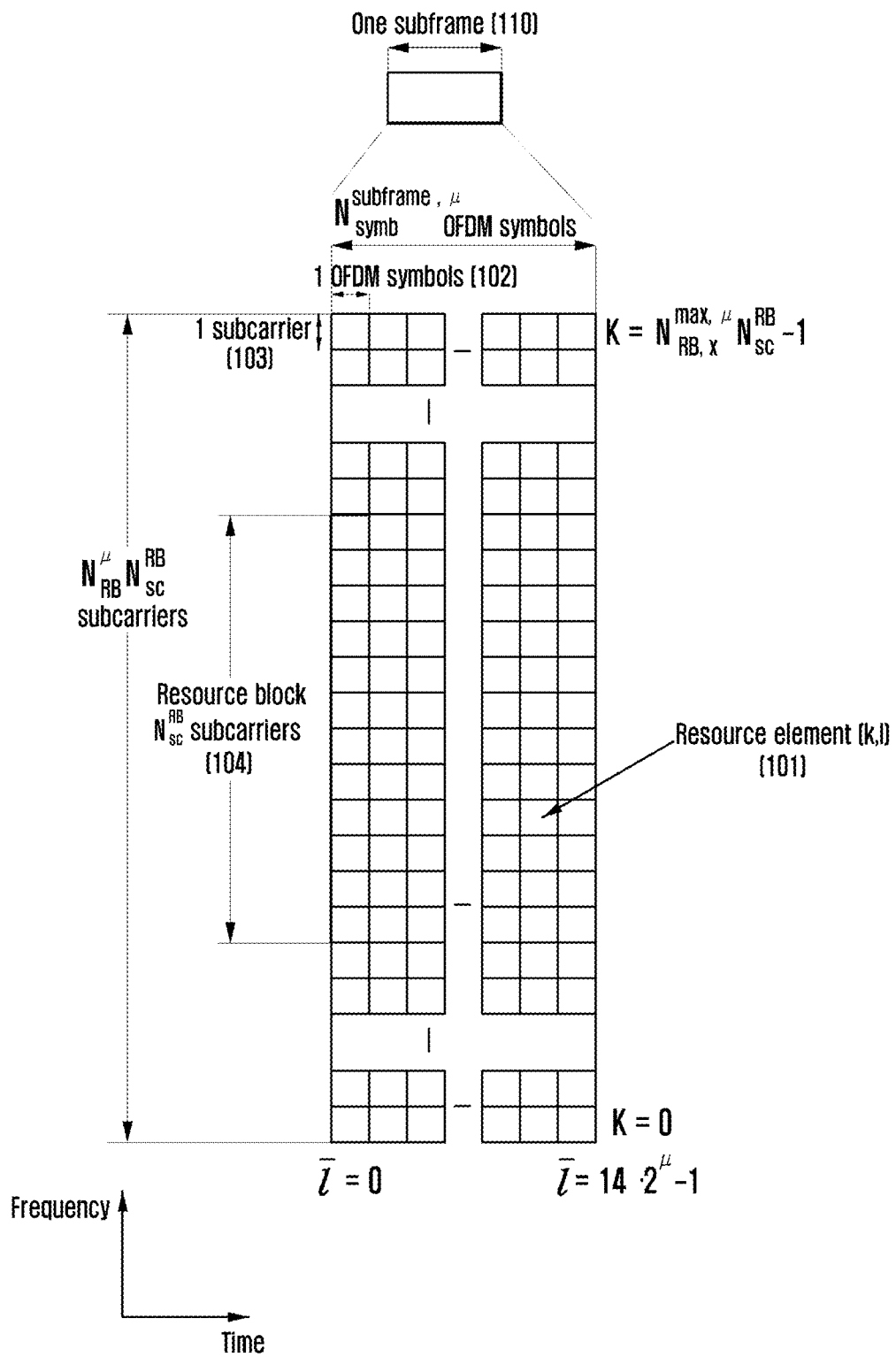
FIG. 1 is a diagram illustrating a time-frequency domain transmission structure of an LTE, LTE-Advanced, NR or similar wireless communication system.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto.

The following description of the disclosure is directed to technology for receiving broadcast information from a base station by a terminal in a wireless communication system. The disclosure relates to a communication technique for converging IoT technology with a 5th generation (5G) communication system designed to support a higher data transfer rate beyond the 4th generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

As used in the following description, terms referring to broadcast information, terms referring to control information, terms related to communication coverage, terms referring to state changes (e.g., events), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution (3GPP LTE) standards will be used for the convenience of description. However, the disclosure is not limited by these terms and names, and may be applied in the same way to systems that conform other standards.

A wireless communication system has evolved from providing an initial voice-oriented service to a broadband wireless communication system that provides high-speed and high-quality packet data services, such as high speed packet access (HSPA) in 3GPP, long-term evolution (LTE) or evolved universal terrestrial radio access (E-UTRA), LTE-advanced (LTE-A), LTE-pro, high rate packet data (HRPD) in 3GPP2, ultra-mobile broadband (UMB), and communication standards such as IEEE's 802.16e.

In the LTE system, which is a representative example of a broadband wireless communication system, in downlink (DL), an orthogonal frequency division multiplexing (OFDM) scheme is adopted, and in uplink (UL), a single carrier frequency division multiple access (SC-FDMA) scheme is adopted. Uplink refers to a radio link through which a user equipment (UE) or mobile station (MS) transmits data or control signals to a base station (BS) (eNode B or base station), and downlink refers to a radio link through which a base station transmits data or control signals to the UE. The above-described multiple access method allows the data or control information of each user to be distinguished by allocating and operating the time-frequency resources to which the data or control information for each user are to be transmitted do not overlap each other, that is, to establish orthogonality.

The 5G communication system, which is a communication system after LTE, must support services that simultaneously satisfy various requirements so that various requirements from users and service providers can be freely reflected. Services considered for the 5G communication system include enhanced Mobile Broadband (eMBB), massive Machine-Type Communication, (mMTC), and Ultra-Reliability Low-Latency Communication (URLLC).

According to an embodiment, eMBB aims to provide more improved data transfer rates than those supported by existing LTE, LTE-A or LTE-Pro. For example, in the 5G communication system, the eMBB should be able to provide a peak data rate of 20 Gbps in the downlink and a peak data rate of 10 Gbps in the uplink from the viewpoint of one base station. At the same time, the 5G communication system must provide the increased user-perceived data rate of the UE. In order to satisfy such a requirement, it may be required to improve various transmission/reception technologies, including a more advanced multiple-input and multiple-output (MIMO) transmission technology. In addition, by using a frequency bandwidth wider than 20 MHz in a frequency band of 3 to 6 GHz or 6 GHz or higher instead of the 2 GHz band currently used by LTE, the data transmission rate required by the 5G communication system may be satisfied.

At the same time, mMTC is being considered to support application services such as the Internet of Things (IoT) in the 5G communication system. In order to efficiently provide the Internet of Things, mMTC may be required to support a large-scale UE access in a cell, improve coverage of the UE, improve battery time, reduce the cost of the UE, etc. Because the Internet of Things is attached to various sensors and various devices to provide communication functions, it must be able to support a large number of UEs (e.g., 1,000,000 UEs/km2) within a cell. In addition, because a UE supporting mMTC is highly likely to be located in a shaded area such as the basement of a building that a cell cannot cover due to the nature of the service, it may be required to have wider coverage compared to other services provided by the 5G communication system. A UE supporting mMTC must be composed of a low-cost UE, and because it is difficult to frequently exchange the battery of the UE, a very long battery life time may be required.

Lastly, the URLLC is a cellular-based wireless communication service used for a specific purpose (mission-critical) and a service, for example, used for remote control of a robot or machinery, industrial automation, an unmanned aerial vehicle, remote health care, an emergency alert, etc., and must provide very low latency and very high reliability. For example, a service supporting URLLC must satisfy an air interface latency of less than 1 millisecond (ms) and, at the same time, must satisfy the requirement of a packet error rate of 10-5 or less. Therefore, for a service supporting URLLC, the 5G system must provide a transmit time interval (TTI) that is smaller than that of other services, and, at the same time, must allocate a wide resource in a frequency band as the design requirements. However, the aforementioned mMTC, URLLC, and eMBB are only examples of different service types, and the service types to which the disclosure is applied are not limited to the above-described examples.

The services considered in the above-mentioned 5G communication system should be provided by convergence with each other based on one framework. That is, for efficient resource management and control, it is preferable that each service is integrated and controlled and transmitted as a single system rather than being operated independently.

In addition, although the embodiment of the disclosure will be described below using LTE, LTE-A, LTE Pro, or new radio (NR) system as an example, the embodiment of the disclosure may be applied to other communication systems having a similar technical background or channel type. In addition, the embodiments of the disclosure may be applied to other communication systems through some modifications within the scope of the disclosure as judged by a person having skilled technical knowledge.

The disclosure relates to a method and apparatus for repeatedly transmitting data and control signals between a plurality of transmission nodes and UEs performing cooperative communication to improve communication reliability.

According to the disclosure, when network cooperative communication is used in a wireless communication system, the reliability of the UE received data/control signal may be improved.

Hereinafter, a frame structure of the 5G system will be described in more detail with reference to the drawings.

FIG. 1 is a diagram illustrating the basic structure of a time-frequency domain, which is a radio resource domain in which data or a control channel is transmitted in a 5G system. Referring to FIG. 1, the horizontal and vertical axes represent the time domain and the frequency domain, respectively. The basic unit of resource in the time domain and frequency domain is a resource element (RE) 101, which may be defined as one orthogonal frequency-division multiplexing (OFDM) or single carrier frequency-division multiplex (SC-FDMA) symbol 102 in the time axis and may be defined as one subcarrier 103 in the frequency axis. One resource block (RB) 104 in the frequency domain may consist of NscRB consecutive REs (e.g., 12).

Figure 2:
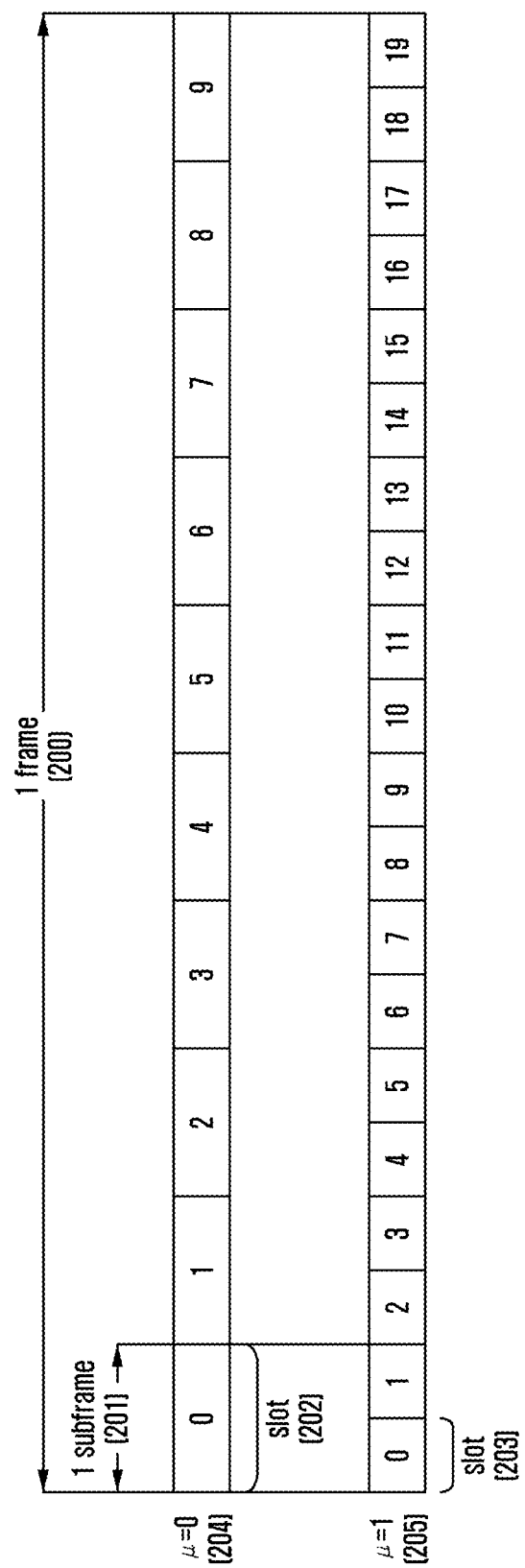
FIG. 2 is a diagram illustrating a frame, a subframe, and a slot structure in a 5G system.

FIG. 2 is a diagram illustrating a frame, a subframe, and a slot structure of in a 5G system.

Referring to FIG. 2, an example of structures of a frame 200, a subframe 201, and a slot 202 is illustrated. One frame 200 may be defined as 10 ms. One subframe 201 may be defined as 1 ms, and accordingly, one frame 200 may consist of a total of 10 subframes 201. One slot 202 and 203 may be defined as 14 OFDM symbols (that is, the number of symbols per slot ($N_{symb}^{slot}$)=14). One subframe 201 may consist of one or more slots 202 and 203, and the number of slots 202 and 203 per one subframe 201 may vary according to a set value μ 204 and 205 for the subcarrier spacing. In an example of FIG. 2, the case where μ1=0 204 and μ=1 205 is illustrated as the subcarrier spacing set value. When μ=0 204, one subframe 201 may consist of one slot 202, and when μ=1 205, one subframe 201 may consist of two slots 203. That is, depending on the set value μ for the subcarrier spacing, the number of slots per one subframe ($N_{slot}^{subframe,\mu}$) may vary, and accordingly, the number of slots per one frame ($N_{slot}^{frame,\mu}$) may vary. The $N_{slot}^{subframe,\mu}$ and $N_{slot}^{frame,\mu}$ depending on each subcarrier spacing set value μ may be defined in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the NR system, it is possible for one component carrier (CC) or a serving cell to consist of up to 250 or more RBs. Therefore, when the UE always receives the entire serving cell bandwidth like LTE, power consumption of the UE may be extreme, and to solve this problem, the base station may configure one or more bandwidth parts (BWP) to the UE to support the UE to change the reception area within the cell.

In the NR system, the base station may configure the initial BWP, which is the bandwidth of the CORESET #0 (or common search space (CSS)), to the UE through an MIB. Thereafter, the base station may configure the first BWP of the UE through radio resource control (RRC) signaling and provide at least one BWP setting information that may be indicated through the downlink control information (DCI) in the future. Thereafter, the base station may indicate to the UE which band the UE will use by notifying the BWP ID through DCI. If the UE does not receive DCI in the currently allocated BWP for a specific time or longer, the UE attempts to receive DCI by returning to the default BWP.

Figure 3:
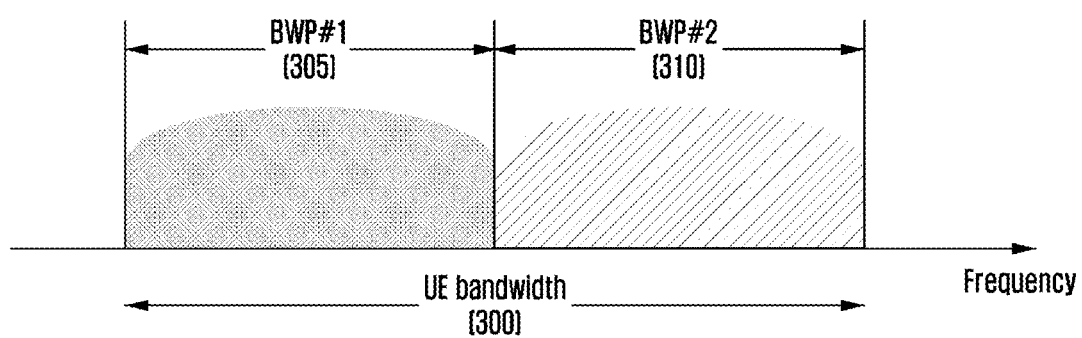
FIG. 3 illustrates an example of a configuration of a bandwidth part (BWP) according to some embodiments in a wireless communication system according to an embodiment of the disclosure.

FIG. 3 illustrates an example of a configuration of a bandwidth part in a wireless communication system according to an embodiment of the disclosure. Referring to FIG. 3, FIG. 3 illustrates an example in which the UE bandwidth 300 is configured to two bandwidth parts, namely, BWP #1 305 and BWP #2 310. Unlike the example of FIG. 3, a plurality of bandwidth parts may be configured to overlap each other. The base station may configure one or more bandwidth parts to the UE, and may configure information as illustrated in Table 2 below for each bandwidth part.

TABLE 2

| BWP ::= | SEQUENCE { |
| --- | --- |
| bwp-Id | BWP-Id, |
| (bandwidth part identifier) | |
| locationAndBandwidth | INTEGER (1..65536), |
| (bandwidth part location) | |
| subcarrierSpacing ENUMERATED {n0, n1, n2, n3, n4, n5}, | |
| (subcarrier spacing) | |
| cyclicPrefix | ENUMERATED { extended } |
| (cyclic prefix) | |
| } | |

In addition to the configuration information described in Table 2, various parameters related to the bandwidth part may be configured to the UE. The above-described information may be transmitted by the base station to the UE through higher layer signaling (e.g., RRC signaling). At least one bandwidth part among one or more configured bandwidth parts may be activated. Information on whether the configured bandwidth part is activated may be semi-statically transmitted from the base station to the UE through RRC signaling, or may be dynamically transmitted through MAC control element (CE) or DCI.

The configuration for the bandwidth part supported by the 5G communication system may be used for various purposes.

As an embodiment, when the bandwidth supported by the UE is smaller than the system bandwidth, the bandwidth supported by the UE may be configured through the configuration for the bandwidth part. For example, in Table 2, as the frequency location of the bandwidth part is configured to the UE, the UE may transmit and receive data at a specific frequency location within the system bandwidth.

As another embodiment, for the purpose of supporting different numerologies (subcarrier spacing, slot or mini-slot length, etc.), the base station may configure a plurality of bandwidth parts to the UE. For example, in order to support both data transmission and reception using a subcarrier spacing of 15 kHz and a subcarrier spacing of 30 kHz to an arbitrary UE, two bandwidth parts may be configured to use a subcarrier spacing of 15 kHz and 30 kHz, respectively. Different bandwidth parts may be frequency division multiplexed (FDM), and when data is transmitted/received at a specific subcarrier spacing, the bandwidth part configured for the corresponding subcarrier spacing may be activated.

As another embodiment, for the purpose of reducing power consumption of the UE, the base station may configure bandwidth parts having different sizes of bandwidth to the UE. For example, when the UE supports a very large bandwidth, for example, a bandwidth of 100 MHz and always transmits and receives data using the corresponding bandwidth, very large power consumption may be caused. In particular, it is very inefficient in terms of power consumption for the UE to monitor the downlink control channel for an unnecessarily large bandwidth of 100 MHz in a situation in which there is no traffic. Therefore, for the purpose of reducing power consumption of the UE, the base station may configure a bandwidth part of a relatively narrow bandwidth to the UE, for example, a bandwidth part of 20 MHz. In the absence of traffic, the UE may monitor in a bandwidth part of 20 MHz, and when data are generated, the UE may transmit/receive data using the bandwidth part of 100 MHz according to the instruction of the base station.

Figure 4:
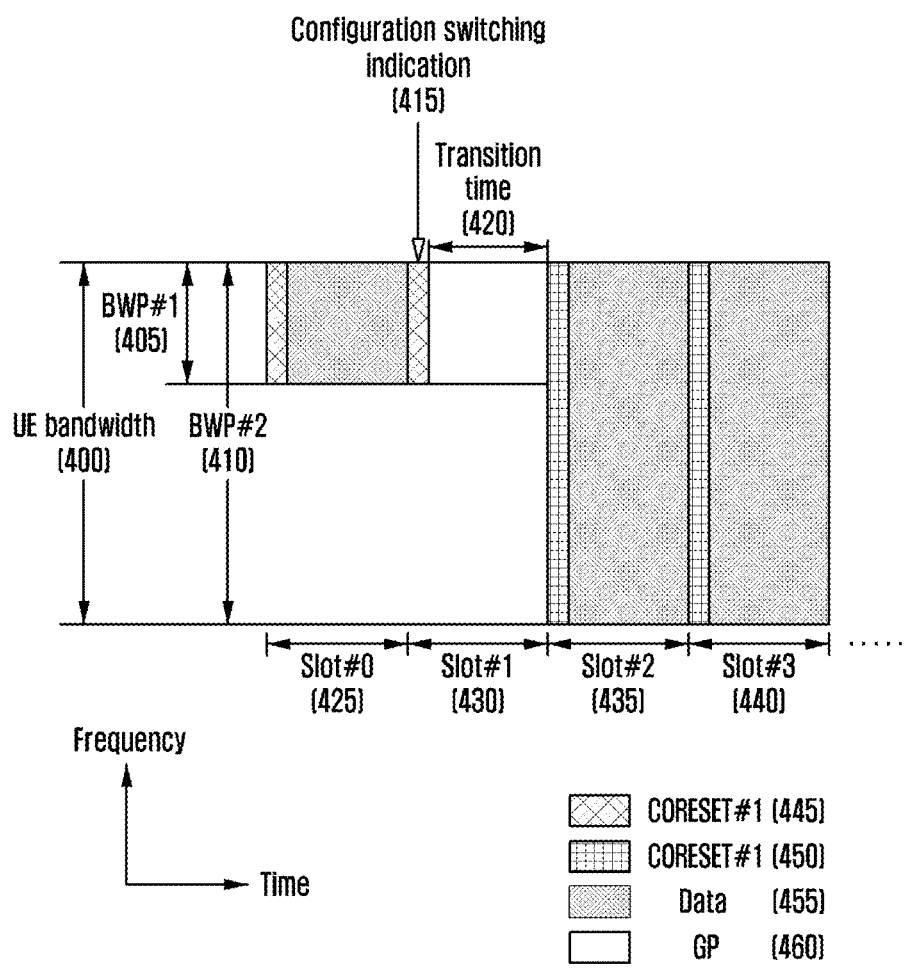
FIG. 4 is a diagram illustrating an example of indicating and changing a bandwidth part according to some embodiments in a wireless communication system according to an embodiment of the disclosure.

FIG. 4 is a diagram illustrating an example of indicating and changing a bandwidth part according to some embodiments in a wireless communication system according to an embodiment of the disclosure.

Referring to FIG. 4, as described in Table 2 above, the base station may configure one or a plurality of bandwidth parts to the UE, and may inform the UE of information on the bandwidth of the bandwidth part, the frequency location of the bandwidth part, and the numerology of the bandwidth part by configuring for each bandwidth part. FIG. 4 illustrates an example in which two bandwidth parts, the bandwidth part #1 (BWP #1) 405 and the bandwidth part #2 (BWP #2) 410 are configured for one UE in the UE bandwidth 400. One or a plurality of bandwidth parts may be activated among the configured bandwidths, and an example in which one bandwidth part is activated may be considered in FIG. 4. In FIG. 4, the bandwidth part #1 402 among the bandwidth parts configured in the slot #0 425 is in an active state, and the UE may monitor a physical downlink control channel (PDCCH) in the control area #1 445 configured in the bandwidth part #1 405, and may transmit and receive data 455 in the bandwidth part #1 405. A control area in which the UE receives the PDCCH may be different according to which bandwidth part among configured bandwidth parts is activated, and accordingly, the bandwidth in which the UE monitors the PDCCH may vary.

The base station may additionally transmit an indicator changing the configuration for the bandwidth part to the UE. In this case, changing the configuration for the bandwidth part may be considered the same as an operation of activating a specific bandwidth part (e.g., switching the activation from the bandwidth part A to the bandwidth part B). The base station may transmit a configuration switching indicator to the UE in a specific slot, and after receiving the configuration switching indicator from the base station, the UE may determine a bandwidth part to be activated by applying the changed configuration according to the configuration switching indicator from a specific time point, and may monitor the PDCCH in a control area configured in the activated bandwidth part.

In FIG. 4, the base station may transmit the configuration switching indicator 415 instructing the UE to change the activated bandwidth part from the existing bandwidth part #1 405 to the bandwidth part #2 410 in the slot #1 430. After receiving the indicator, the UE may activate the bandwidth part #2 410 according to the content of the indicator. In this case, a transition time 420 for changing the bandwidth part may be required, and accordingly, a time point for changing and applying the active bandwidth part may be determined. FIG. 4 illustrates a case in which a transition time 420 of one slot is required after receiving the configuration switching indicator 415. In the transition time 420, data transmission/reception may not be performed 460. Accordingly, the bandwidth part #2 410 is activated in the slot #2 435, and an operation of transmitting and receiving a control channel and data through the corresponding bandwidth part may be performed.

The base station may preconfigure one or more bandwidth parts to the UE through higher layer signaling (e.g., RRC signaling), and may instruct activation by a method in which the configuration switching indicator 415 is mapped with one of the bandwidth part configurations preconfigured by the base station. For example, the [log 2N] bit indicator may indicate by selecting one of N preconfigured bandwidth parts. In Table 3 below, an example of indicating configuration information for a bandwidth part using a 2-bit indicator is described.

TABLE 3

| Indicator value | Bandwidth part configuration |
|---|---|
| 00 | Bandwidth configuration A through higher layer signaling |
| 01 | Bandwidth configuration B through higher layer signaling |
| 10 | Bandwidth configuration C through higher layer signaling |
| 11 | Bandwidth configuration D through higher layer signaling |

The configuration switching indicator 415 for the bandwidth part described in FIG. 4 may be delivered from the base station to the UE in the form of medium access control (MAC) control element (CE) signaling or L1 signaling. (e.g., common DCI, group-common DCI, and UE-specific DCI)

According to the configuration switching indicator 415 for the bandwidth part described in FIG. 4, from which time point the bandwidth part activation is applied may depend on the following. From which time point the configuration change is applied may follow a predefined value (e.g., after receiving the configuration switching indicator, the configuration change is applied from after the N (>1) slot), or may be configured by the base station to the UE through higher layer signaling (e.g., RRC signaling), or may be partially included in the content of the configuration switching indicator 415 and transmitted. Alternatively, it may be determined by a combination of the above methods. After receiving the configuration switching indicator 415 for the bandwidth part, the UE may apply the changed configuration from the time point obtained by the above-described method.

Hereinafter, a downlink control channel in a 5G communication system will be described in more detail with reference to the drawings.

Figure 5:
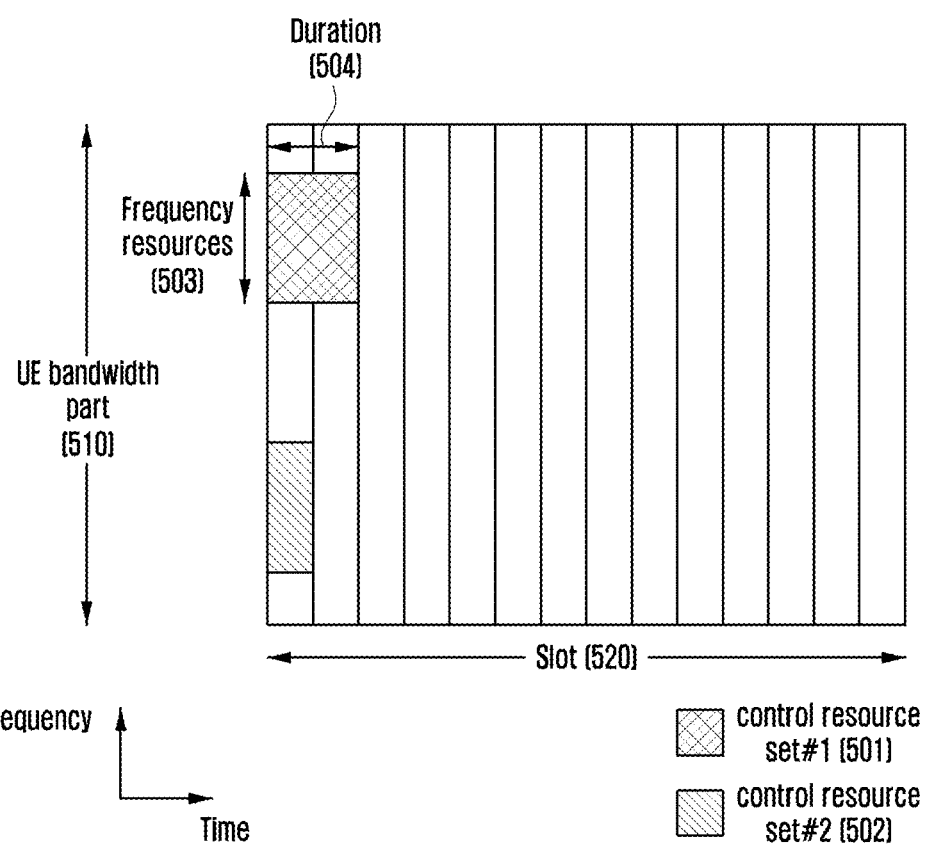
FIG. 5 is a diagram illustrating an example of configuring a control area of a downlink control channel according to some embodiments in a wireless communication system according to an embodiment of the disclosure.

FIG. 5 is a diagram illustrating an example of configuring a control area of a downlink control channel according to some embodiments in a wireless communication system according to an embodiment of the disclosure.

Referring to FIG. 5, FIG. 5 illustrates an example in which a UE bandwidth part 510 is configured on the frequency axis and two control areas (control resource set, CORESET, and in FIG. 5, the control area #1 501 and the control area #2 502 are configured) are configured in one slot 520 on the time axis. The control areas 501 and 502 may be configured to a specific frequency resource 503 within the entire UE bandwidth part 510 on the frequency axis. The control areas 501 and 502 may be configured with one or a plurality of OFDM symbols on the time axis, and may be defined by a control area length (control resource set duration, 504). In an example of FIG. 5, control area #1 501 may be configured to a control area length of 2 symbols, and control area #2 502 may be configured to a control area length of 1 symbol.

The control area in the above-described 5G system may be configured by the base station to the UE through higher layer signaling (e.g., system information, master information block (MIB), radio resource control (RRC) signaling). Configuring the control area to the UE refers to providing information such as a control area identifier (identity), a frequency location of the control area, and a symbol length of the control area, etc. For example, the information of Table 4 may be included.

TABLE 4

```
ControlResourceSet ::=                SEQUENCE {
-- Corresponds to L1 parameter 'CORESET-ID'
controlResourceSetId                  ControlResourceSetId,
(control area identifier (Identity))
frequencyDomainResources              BIT STRING (SIZE (45)),
(frequency axis resource allocation information)
duration                              INTEGER (1..maxCoReSetDuration),
(time axis resource allocation information)
cce-REG-MappingType                   CHOICE {
(CCE-to-REG mapping type)
interleaved                           SEQUENCE {
reg-BundleSize                        ENUMERATED {n2, n3, n6},
(REG bundle size)
precoderGranularity ENUMERATED {sameAsREG-bundle, allContiguousRBs},
interleaverSize                       ENUMERATED {n2, n3, n6}
(interleaver size)
shiftIndex INTEGER(0..maxNrofPhysicalResourceBlocks-1)   OPTIONAL
(interleaver shift)
},
nonInterleaved                        NULL
},
tci-StatesPDCCH   SEQUENCE(SIZE (1..maxNrofTCI-StatesPDCCH)) OF TCI-StateId
                                      OPTIONAL,
(QCL configuration information)
tci-PresentInDCI   ENUMERATED {enabled}OPTIONAL,   -- Need S
}
```

In Table 4, the tci-StatesPDCCH (simply named as transmission configuration indication (TCI) state) configuration information may include information on one or more SS (Synchronization Signal)/PBCH (Physical Broadcast Channel) block indexes in a Quasi co-located (QCL) relationship with demodulation reference signal (DMRS) transmitted in a corresponding control area or channel state information reference signal (CSI-RS) indexes.

QCL may be expressed as follows. Between two antenna ports, for example, if the large-scale property of a radio channel through which one symbol is transmitted through one antenna port can be inferred from a radio channel through which one symbol is transmitted through another antenna port, the two antenna ports can be said to be QCL. That is, the QCL relationship refers to that all or part of the large-scale properties of a signal (or the radio channel corresponding to the corresponding antenna port) received by the UE from one antenna port may be assumed to be the same as the large-scale properties of a signal (or the radio channel corresponding to the corresponding antenna port) received from the other antenna port. The large-scale properties include Doppler spread related to frequency offset, Doppler shift, average delay related to timing offset, delay spread, etc., and may further include an average gain or a spatial parameter.

The configuration of the TCI state may include the following information.

TABLE 5

```
TCI-State ::=                         SEQUENCE {
tci-StateId                           TCI-StateId,
qcl-Type1                             QCL-Info,
qcl-Type2         QCL-Info            OPTIONAL,   -- Need R
...
}
QCL-Info ::=                          SEQUENCE {
cell (cell index)     ServCellIndex           OPTIONAL,   -- Need R
bwp-Id (BWP index)    BWP-Id OPTIONAL, -- Cond CSI-RS-Indicated
referenceSignal (reference RS index)          CHOICE {
csi-rs                                NZP-CSI-RS-ResourceId,
ssb                                   SSB-Index
},
qcl-Type          ENUMERATED {typeA, typeB, typeC, typeD},
...
}
```

Referring to the TCI state configuration, the index of the reference RS in the QCL relationship, that is, the cell index and/or the BWP index and the QCL type of the reference RS together with the SS/PBCH block index or the CSI-RS index may be configured. The QCL type indicates a channel characteristic that is assumed to be shared between the reference RS and the control area DMRS, and examples of possible QCL types are as follows.

QCL typeA: Doppler shift, Doppler spread, average delay, and delay spread
QCL typeB: Doppler shift and Doppler spread
QCL typeC: Doppler shift and average delay
QCL typeD: Spatial Rx parameter The TCI state may be configured similarly not only for the control area DMRS but also for other target RSs, such as PDSCH DMRS and CSI-RS.

Next, downlink control information (DCI) in the NR system will be described in detail. In the NR system, scheduling information for uplink data (or physical uplink shared channel (PUSCH)) or downlink data (or physical downlink data channel (PDSCH)) is transmitted from the base station to the UE through DCI. For efficient control channel reception of the UE, various types of DCI formats are provided as illustrated in Table 6 below according to the purpose.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

The UE may monitor the DCI format for fallback and the DCI format for non-fallback for PUSCH or PDSCH. The DCI format for fallback may be configured as a fixed field predetermined between the base station and the UE, and the DCI format for non-fallback may include a configurable field.

DCI may be transmitted through a PDCCH after channel coding and modulation processes. A cyclic redundancy check (CRC) may be attached to the DCI message payload, and the CRC may be scrambled by a radio network temporary identifier (RNTI) corresponding to the identity of the UE. Depending on the purpose, for example, UE-specific data transmission, a power control command, or a random access response, of the DCI message, different RNTIs may be used. That is, the RNTI may not be explicitly transmitted, but may be transmitted while being included in the CRC calculation process. When the DCI message transmitted on the PDCCH is received, the UE may identify the CRC using the allocated RNTI. If the CRC identification result is correct, the UE may determine that the corresponding message has been transmitted to the UE.

For example, DCI scheduling a PDSCH for system information (SI) may be scrambled by SI-RNTI. DCI scheduling a PDSCH for a random access response (RAR) message may be scrambled by RA-RNTI. DCI scheduling a PDSCH for a paging message may be scrambled by a P-RNTI. DCI providing a slot format indicator (SFI) may be scrambled by SFI-RNTI. DCI providing a transmit power control (TPC) may be scrambled by TPC-RNTI. DCI providing interruption information for a downlink data channel may be scrambled by INT-RNTI.

DCI scheduling a UE-specific PDSCH or PUSCH may be scrambled by C-RNTI (Cell RNTI).

DCI format 0_0 may be used as fallback DCI scheduling PUSCH, and in this case, CRC may be scrambled by C-RNTI. DCI format 0_0 in which CRC is scrambled by C-RNTI may include information, for example, as illustrated in Table 7 below.

TABLE 7

- Identifier for DCI formats (DCI format identifier) - [1] bit
- Frequency domain resource assignment - [ $\lceil \log_2(N_{RB}^{UL,BWP}(N_{RB}^{UL,BWP} + 1)/2 \rceil$ ] bits
- Time domain resource assignment - 4 bits
- Frequency hopping flag - 1 bit.
- Modulation and coding scheme - 5 bits
- New data indicator - 1 bit
- Redundancy version - 2 bits
- HARQ process number - 4 bits
- TPC command for scheduled PUSCH (transmit power control command for scheduled PUSCH) - [2] bits
- UL/SUL indicator (uplink/supplementary UL indicator) - 0 or 1 bit DCI format 0_1 may be used as non-fallback DCI scheduling PUSCH, in this case, CRC may be scrambled by C-RNTI. DCI format 0_1 in which CRC is scrambled may include information, for example, as illustrated in Table 8 below.

TABLE 8

- Carrier indicator - 0 or 3 bits
- UL/SUL indicator - 0 or 1 bit
- Identifier for DCI formats - [1] bits
- Bandwidth part indicator - 0, 1 or 2 bits
- Frequency domain resource assignment
  ○ For resource allocation type 0, $\lceil N_{RB}^{UL,BWP}/P \rceil$ bits
  ○ For resource allocation type 1, $\lceil \log_2(N_{RB}^{UL,BWP}(N_{RB}^{UL,BWP}+1)/2 \rceil$ bits
- Time domain resource assignment - 1, 2, 3, or 4 bits
- VRB-to-PRB mapping (virtual resource block-to-physical resource block mapping) - 0 or 1 bit, only for resource allocation type 1.
  ○ 0 bit if only resource allocation type 0 is configured;
  ○ 1 bit otherwise.
- Frequency hopping flag - 0 or 1 bit, only for resource allocation type 1.
  ○ 0 bit if only resource allocation type 0 is configured;
  ○ 1 bit otherwise.
- Modulation and coding scheme - 5 bits
- New data indicator - 1 bit
- Redundancy version - 2 bits
- HARQ process number - 4 bits
- 1st downlink assignment index - 1 or 2 bits
  ○ 1 bit for semi-static HARQ-ACK codebook;
  ○ 2 bits for dynamic HARQ-ACK codebook with single HARQ-ACK codebook.
- 2nd downlink assignment index - 0 or 2 bits
  ○ 2 bits for dynamic HARQ-ACK codebook with two HARQ-ACK sub- TABLE 8-continued codebooks;
  ○ 0 bit otherwise.
- TPC command for scheduled PUSCH - 2 bits
- SRS resource indicator - $\left\lceil \log_2\left(\sum_{k=1}^{L_{max}} \binom{N_{SRS}}{k}\right) \right\rceil$ or $\lceil \log_2(N_{SRS}) \rceil$ bits
  ○ $\left\lceil \log_2\left(\sum_{k=1}^{L_{max}} \binom{N_{SRS}}{k}\right) \right\rceil$ bits for non-codebook based PUSCH transmission;
  ○ $\lceil \log_2(N_{SRS}) \rceil$ bits for codebook based PUSCH transmission.
- Precoding information and number of layers - up to 6 bits
- Antenna ports - up to 5 bits
- SRS request - 2 bits
- CSI request (channel status information request) - 0, 1, 2, 3, 4, 5, or 6 bits
- CBG transmission information (code block group transmission information) - 0, 2, 4, 6, or 8 bits
- PTRS-DMRS association (phase tracking reference signal-demodulation reference signal association) - 0 or 2 bits.
- beta_offset indicator - 0 or 2 bits
- DMRS sequence initialization (demodulation reference signal sequence initialization) - 0 or 1 bit DCI format 1_0 may be used as fallback DCI scheduling PDSCH, and in this case, CRC may be scrambled by C-RNTI. DCI format 1_0 in which CRC is scrambled by C-RNTI may include information, for example, as illustrated in Table 9 below.

TABLE 9

- Identifier for DCI formats - [1] bit
- Frequency domain resource assignment - [ $\lceil \log_2(N_{RB}^{DL,BWP}(N_{RB}^{DL,BWP} + 1)/2 \rceil$ ] bits
- Time domain resource assignment - 4 bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator (physical uplink control channel (PUCCH) resource indicator)
- 3 bits
- PDSCH-to-HARQ feedback timing indicator - [3] bits DCI format 1_1 may be used as non-fallback DCI scheduling PDSCH, and in this case, CRC may be scrambled by C-RNTI. DCI format 1_1 in which CRC is scrambled by C-RNTI may include information, for example, as illustrated in Table 10 below.

TABLE 10

- Carrier indicator - 0 or 3 bits
- Identifier for DCI formats - [1] bits
- Bandwidth part indicator - 0, 1 or 2 bits
- Frequency domain resource assignment
  ○ For resource allocation type 0, $\lceil N_{RB}^{DL,BWP}/P \rceil$ bits
  ○ For resource allocation type 1, $\lceil \log_2(N_{RB}^{DL,BWP}(N_{RB}^{DL,BWP} + 1)/2) \rceil$ bits
- Time domain resource assignment - 1, 2, 3, or 4 bits
- VRB-to-PRB mapping - 0 or 1 bit, only for resource allocation type 1.
  ○ 0 bit if only resource allocation type 0 is configured;
  ○ 1 bit otherwise.
- PRB bundling size indicator (physical resource block bundling size indicator) - 0 or 1 bit
- Rate matching indicator - 0, 1, or 2 bits
- ZP CSI-RS trigger (zero-power channel status information-reference signal trigger) - 0, 1, or 2 bits
For transport block 1:
- Modulation and coding scheme - 5 bits TABLE 10-continued

Figure 6:
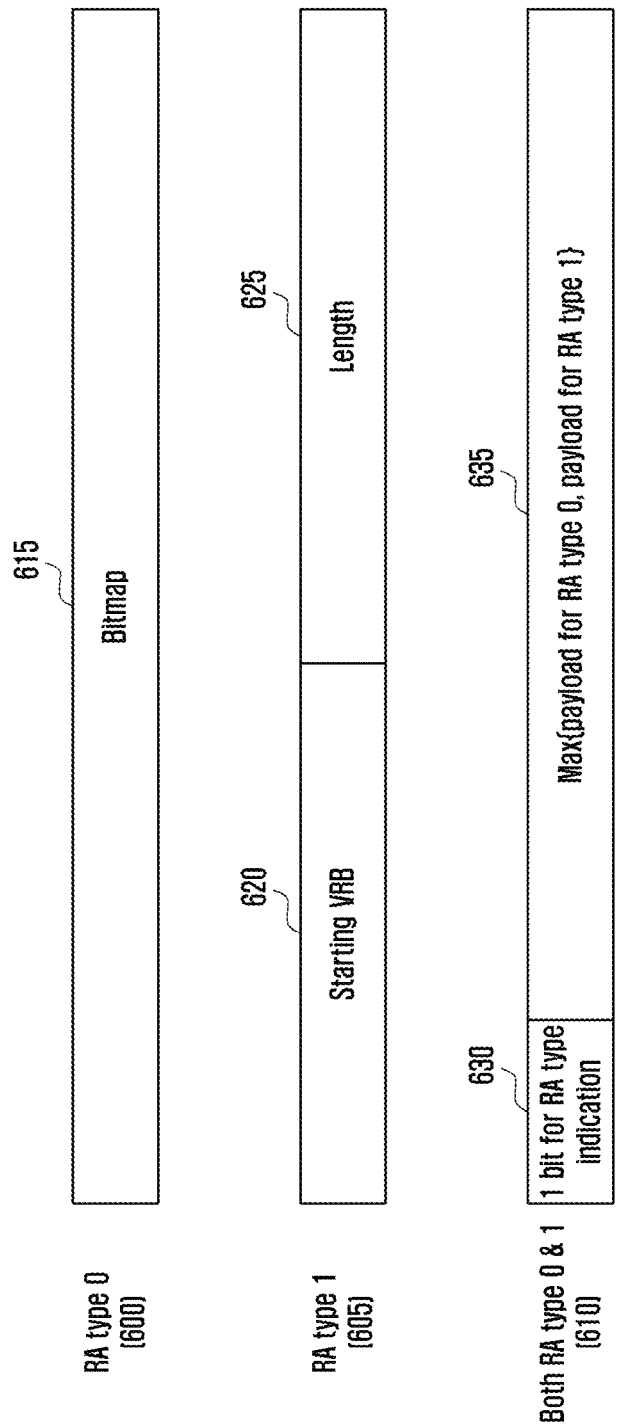
FIG. 6 is a diagram illustrating an example of PDSCH frequency axis resource allocation according to some embodiments in a wireless communication system according to an embodiment of the disclosure.

- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication (TCI) - 0 or 3 bits
- SRS request - 2 bits
- CBG transmission information - 0, 2, 4, 6, or 8 bits
- CBG flushing out information (code block group flushing out information) - 0 or 1 bit
- DMRS sequence initialization - 1 bit In the NR system, in addition to frequency-axis resource candidate allocation through BWP indication, the following detailed frequency domain resource allocation (FDRA) methods may be provided through DCI. FIG. 6 is a diagram illustrating an example of PDSCH frequency domain resource allocation in a wireless communication system according to an embodiment of the disclosure.

Referring to FIG. 6, if the UE is configured to use only RA type (resource allocation type) 0 through higher layer signaling 600, some DCIs allocating a PDSCH to the corresponding UE have a bitmap composed of NRBG bits. The conditions for this will be described again later. At this time, the NRBG refers to the number of resource block groups (RBG) which is determined as illustrated in Table 11 according to the BWP size and higher layer parameter rbg-Size allocated by the BWP indicator, and data is transmitted to the RBG indicated by 1 by the bitmap.

TABLE 11

| BWP size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

If the UE is configured to use only RA type 1 through higher layer signaling 605, some DCIs allocating a PDSCH to the corresponding UE have frequency domain resource allocation information composed of $\lceil \log_2(N_{RB}^{DL,BWP}(N_{RB}^{DL,BWP}+1)/2 \rceil$ bits. The base stationi may configure a starting VRB 620 and a length 625 of a frequency domain resource continuously allocated therefrom.

If the UE is configured to use both RA type 0 and RA type 1 through higher layer signaling 610, some DCIs allocating a PDSCH to the corresponding UE have frequency domain resource allocation information composed of bits of the largest value 635 among the payload 615 for configuring RA type 0 and the payloads 620 and 625 for configuring RA type 1. Conditions for this will be described again later. At this time, one bit may be added to the frontmost portion (MSB) of frequency domain resource allocation information in DCI, and when the bit is 0, it may be indicated that RA type 0 is used, and when it is 1, it may be indicated that RA type 1 is used.

Figure 7:
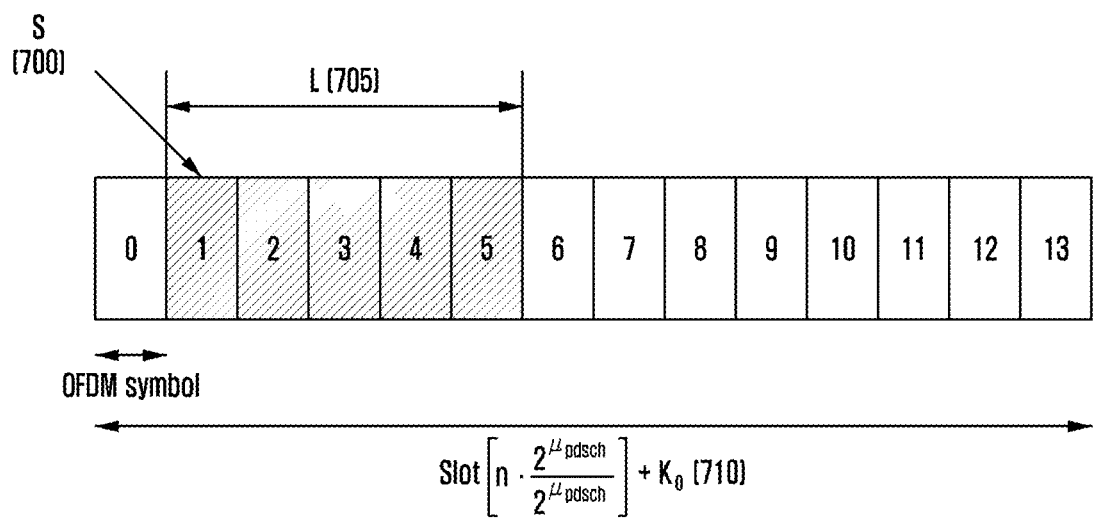
FIG. 7 is a diagram illustrating an example of physical downlink shared channel (PDSCH) time axis resource allocation in a wireless communication system according to an embodiment of the disclosure.

FIG. 7 is a diagram illustrating an example of PDSCH time axis resource allocation in a wireless communication system according to an embodiment of the disclosure. Referring to FIG. 7, the base station may indicate the time axis location of the PDSCH resource according to the OFDM symbol start location 700 and the length 705 in one slot 710 dynamically indicated through subcarrier spacing ($\mu_{PDSCH}$, $\mu_{PDCCH}$) of a data channel and a control channel configured through a higher layer, a scheduling offset (KO) value, and DCI.

The DCI may include a time domain resource allocation field indicating the OFDM symbol start location, length, etc., and the time domain resource allocation field may indicate a value of one of tables consisting of up to 16 entries through higher layer signaling. Each entry may include PDCCH-to-PDSCH slot timing (corresponds to a slot-unit time interval between the time when the PDCCH is received and the time when the PDSCH scheduled by the PDCCH is transmitted, denoted as KO), information on a location and length of a start symbol in which a PDSCH is scheduled in the slot, mapping type information of a PDSCH indicating location allocation information of a DMRS, etc.

Figure 8:
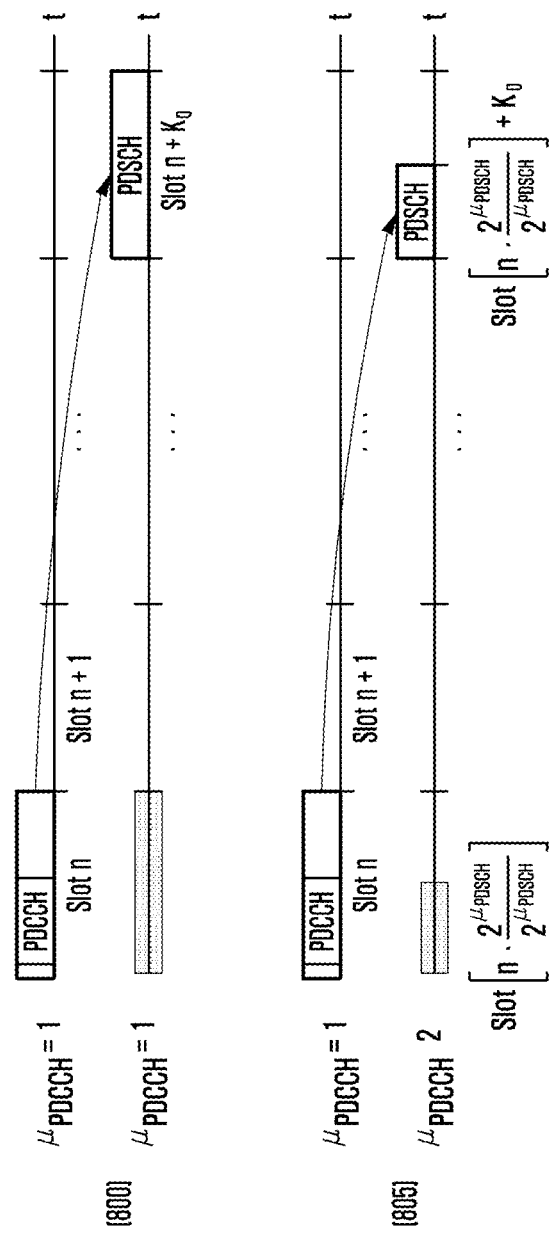
FIG. 8 is a diagram illustrating an example of PDSCH time axis resource allocation according to subcarrier spacings of a data channel and a control channel in a wireless communication system according to an embodiment of the disclosure.

FIG. 8 is a diagram illustrating an example of PDSCH time axis resource allocation according to subcarrier spacings of a data channel and a control channel in a wireless communication system according to an embodiment of the disclosure.

Referring to FIG. 8, when the subcarrier spacings of the data channel and the control channel are the same ($\mu_{PDSCH}=\mu_{PDCCH}$) 800, because the slot numbers for the data channel and the control channel are the same, the base station and the UE may identify that the scheduling offset occurs in accordance with the predetermined slot offset KO. On the other hand, when the subcarrier spacings of the data channel and the control channel are different ($\mu_{PDSCH}\neq\mu_{PDCCH}$) 805, because the slot numbers for the data channel and the control channel are different, the base station and the UE may identify that the scheduling offset occurs in accordance with the predetermined slot offset KO based on the subcarrier spacing of the PDCCH.

Next, a part of the decoding process for the PDSCH scheduled by DCI in the NR system will be described in detail.

The UE is instructed through DCI with a modulation and coding scheme (MCS) of the PDSCH along with frequency and time resource information allocated for the PDSCH. The MCS field of DCI indicates an index for one table selected through a higher layer among the following three tables, Tables 12 (MCS Index Table 1 for PDSCH), 13 (MCS Index Table 2 for PDSCH), and 14 (MCS Index Table 3 for PDSCH). The range of the index indicated during initial transmission and HARQ retransmission may be different. In the initial transmission, indexes 0 to 28 of Table 12, indexes 0 to 27 of Table 13, and indexes 0 to 28 of Table 14 are used, and in the retransmission, indexes 29 to 31 of Table 12, indexes 28 to 31 of Table 13, and indexes 29 to 31 of Table 14 are used. The indexes indicated during initial transmission contain modulation order and target code rate information of the transmitted PDSCH, and the indexes indicated during retransmission contain modulation order information of the transmitted PDSCH.

TABLE 12

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 13

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 14

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

In the case of initial transmission, the UE needs to know the size of a transport block (TB) before the scheduled PDSCH is encoded. For this, the following process is performed, and if two TBs are transmitted, the following process is performed for each codeword.

Step 1) The UE calculates the total number of resource elements (REs) allocated to PDSCH transmission in one slot and one physical resource block (PRB) in which the PDSCH is scheduled as $N'_{RE} = N_{sc}^{RB} \cdot N_{symb}^{sh} - N_{DMRS}^{PRB} - N_{oh}^{PRB}$. In the formula for calculating the total number of REs allocated to PDSCH transmission, $N_{sc}^{RB}$ denotes 12, which is the number of subcarriers in one PRB, and $N_{symb}^{sh}$ denotes the number of symbols in which the PDSCH is scheduled in one slot. In addition, $N_{DMRS}^{PRB}$ indicates the number of REs allocated for the DM-RS in the PRB, which includes the overhead indicated by the DM-RS CDM groups without data on the DCI. In addition, $N_{oh}^{PRB}$ indicates an overhead value indicated through a higher layer. Next, the total number of REs for the entire scheduled PRB is calculated as $N_{RE} = \min(156, N'_{RE}) \cdot n_{PRB}$, and nPRB indicates the total number of PRBs allocated for PDSCH transmission to the UE in the formula for calculating the total number of REs for the entire scheduled PRB.

Step 2) The intermediate number of information bits in the PDSCH is calculated as $N_{info} = N_{RE} \cdot R \cdot Q_m \cdot v$, where R and Qm indicate the target rate and modulation order indicated by the MCS, respectively, and v indicates the number of layers.

Step 3) If the calculated Ninfo value is greater than 3,824, the UE determines that multiple code blocks may be transmitted (Step 5), otherwise, the UE determines that a single code block is transmitted (Step 4).

Step 4) When the UE determines that a single code block is transmitted, the UE calculates $$N'_{info} = \max\left(24, 2^n \cdot \left\lfloor \frac{N_{info}}{2^n} \right\rfloor\right),$$

where $n=\max(3, \lfloor \log_2(N_{info}) \rfloor - 6)$, and then finds a minimum transport block size (TB S) that is not smaller than N'info in Table 15. The TBS found by the UE becomes the transport block (TB) size determined by the UE.

Step 5) When the UE determines that multiple code blocks may be transmitted, the UE performs the following procedures according to the value $$N'_{info} = \max\left(3840, 2^n \times \text{round}\left(\frac{N_{info} - 24}{2^n}\right)\right),$$

where $n = \lfloor \log_2(N_{info} - 24) \rfloor - 5$ and the target code rate.

Step 5-1) When the target code rate <1/4:

$$TBS = 8 \cdot C \cdot \left\lceil \frac{N'_{info} + 24}{8 \cdot C} \right\rceil - 24,$$

where $$C = \left\lceil \frac{N'_{info} + 24}{3816} \right\rceil,$$

calculated C indicates the number of code blocks, and TBS becomes the size of the TB determined by the UE.

Step 5-2) When target code rate >1/4: If N'info>8,424, $$TBS = 8 \cdot C \cdot \left\lceil \frac{N'_{info} + 24}{8 \cdot C} \right\rceil - 24$$

where $$C = \left\lceil \frac{N'_{info} + 24}{3816} \right\rceil,$$

and calculated C indicates the number of code blocks. In the opposite case, $$TBS = 8 \cdot \left\lceil \frac{N'_{info} + 24}{8} \right\rceil - 24,$$

and a single code block is transmitted.

TABLE 15

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |

TABLE 15-continued

| Index | TBS |
| --- | --- |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Meanwhile, in the case of retransmission, it is assumed that the TB size of the retransmitted PDSCH is the same as the TB size calculated during initial transmission.

Figure 9:
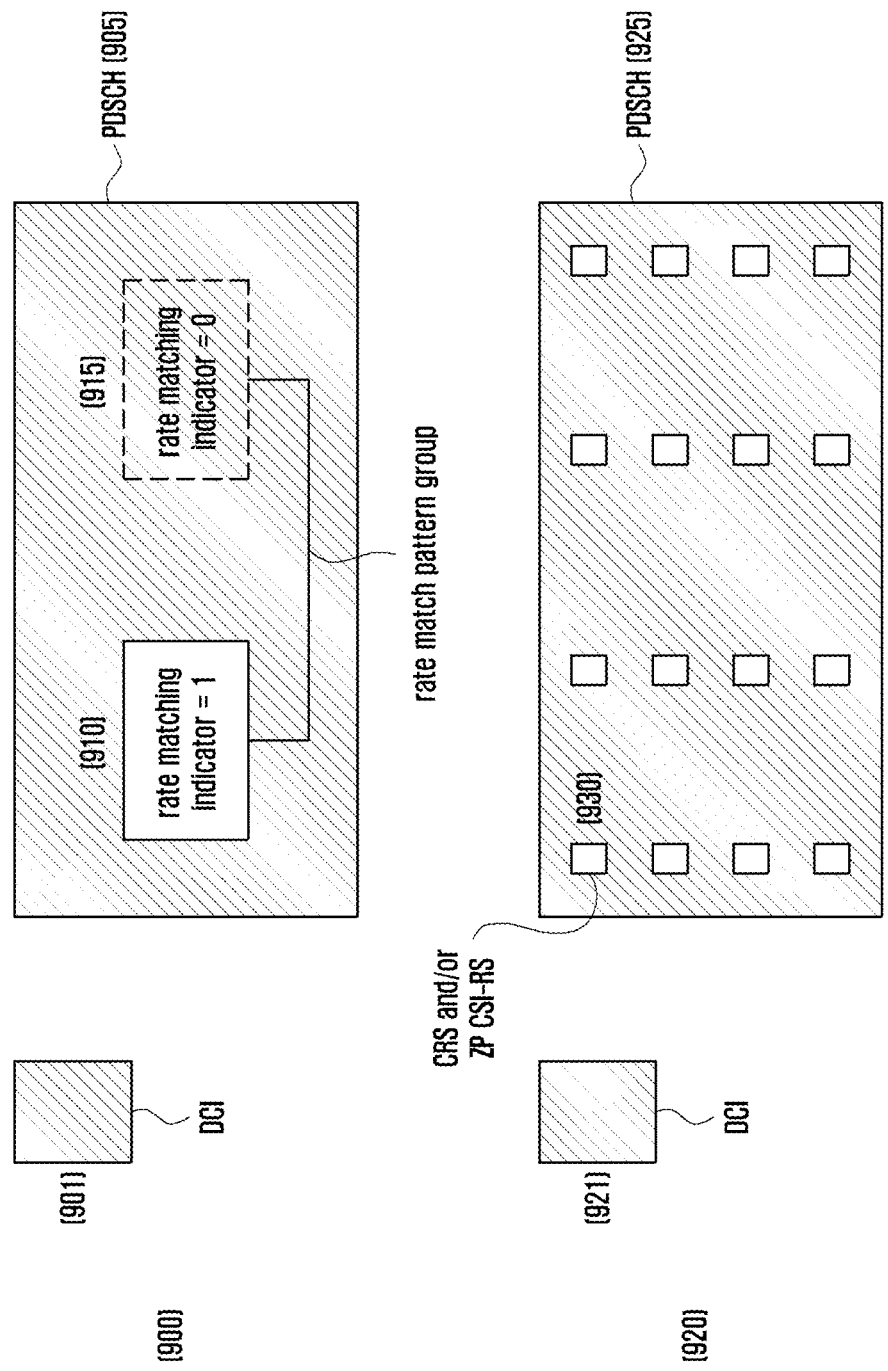
FIG. 9 is a diagram illustrating application of a rate matching resource according to an embodiment of the disclosure.

FIG. 9 is a diagram illustrating a PDSCH resource mapping method in a wireless communication system according to an embodiment of the disclosure.

The PDSCH rate matching may refer to a method in which a specific resource is skipped and PDSCH symbols (or downlink data symbols) are sequentially mapped. Hereinafter, a resource on which rate matching is performed during PDSCH mapping will be described.

When the UE receives the PDSCH scheduled by the PDCCH (or DCI) scrambled by the CRC including the SI-RNTI and if the system information indicator field of the DCI indicates 0, when the UE receives the corresponding PDSCH, it is assumed that there are no REs occupied by the SS/PBCH block. On the other hand, if the field indicates 1, when the UE receives the corresponding PDSCH, because there are REs (or PRBs) pre-occupied by the SS/PBCH block, the UE receives the PDSCH in the remaining resource areas except for the REs in the resource area scheduled by DCI. The above example is equally applicable to the case where the RNTI is an RA-RNTI, a P-RNTI, or a TC-RNTI.

When the UE receives a PDSCH or SPS PDSCH scheduled by a PDCCH (or DCI) including a CRC scrambled by C-RNTI, MCS-RNTI, or CS-RNTI, as illustrated in FIG. 9, REs configured through higher layer signaling 910 or 930, or dynamically indicated through L1 signaling 910 may not be used for the corresponding PDSCH transmission. In addition, when the scheduled PDSCH overlaps with PRBs including SS/PBCH block transmission according to ssb-PositionsInBurst information received by SIB1 or Serving-CellConfigCommon higher signal, the UE assumes that PRBs including the SS/PBCH are not used for the corresponding PDSCH in the symbol in which the SS/PBCH is transmitted. The specific meaning that the above-described specific resource area is not used for the PDSCH is as follows. When a part of the resource areas scheduled by DCI includes a resource area not used for PDSCH, the UE assumes that PDSCH information (i.e., downlink data) is included in the remaining scheduled resource areas except for the corresponding area and receives the remaining scheduled resource areas.

PDSCH rate matching at the RB-symbol level may be performed as follows.

In the NR system, the UE may receive up to 4 RateMatch-Patterns per cell and per BWP configured through a higher signal. The RateMatchPattern may be one of the following.

A resource area composed of an RB-level bitmap and a symbol-level bitmap within the BWP, and the corresponding resource area may be continuous or non-consecutive, and may appear repeatedly with a period of slot units. When configured for each serving cell, the subcarrier spacing to which the corresponding RateMatchPattern is applied is also provided, and when configured for each BWP, the corresponding RateMatchPattern is considered to follow the subcarrier spacing of the corresponding BWP. Corresponding resource areas may be configured separately and then incorporated into one or two rateMatchPatternGroups.

A control channel resource area composed of a combination of frequency information of CORESET and time information of search space in BWP, and corresponding resource areas may be configured separately and then incorporated into one or two rateMatchPatternGroups.

As an example, the UE is configured by rateMatchPatternGroup information 910 and 915 composed of RateMatchPatterns through a higher signal, and when the rate matching indicator (corresponding to that ratedMatch-PatternGroup) is included in the non-fallback DCI format 1_1 901, and the corresponding value is 1 910, the UE may be instructed by the base station that the resource area composed of the RB and symbol level indicated by the corresponding rateMatchPatternGroup is not used for the corresponding PDSCH transmission 905. On the other hand, if the corresponding value is 0 915, the UE may be instructed by the base station that the resource area composed of the RB and symbol level indicated by the corresponding rateMatchPatternGroup is used for the corresponding PDSCH transmission. "Rate matching indicator" may consist of up to two bits, and each bit may inform whether each rateMatchPatternGroup is used for PDSCH transmission. If both bits indicate 1, the base station informs the UE that the resource area composed of the RB and the symbol level composed of the union of the two rateMatchPatternGroups is not used for the corresponding PDSCH transmission. In addition, although not associated with the "rate matching indicator" included in the non-fallback DCI format 1_1 901, the resource areas indicated by rateMatchPatternGroups configured as higher signals are not always used for PDSCH or SPS PDSCH scheduled by non-fallback DCI or fallback DCI.

If the PDSCH scheduled by the PDCCH and the resource area of the CORESET included in the PDCCH are partially or entirely overlap, neither the PDCCH resource area scheduled the corresponding PDSCH nor the DMRS resource area used for PDCCH decoding are used for the corresponding PDSCH.

PDSCH rate matching of the RE level may be performed as follows. It may be possible for the UE to receive the configuration that the resource area consisting of the RE level is not used for PDSCH transmission through a higher signal as follows.

When the PDSCH has a subcarrier spacing of 15 kHz through higher layer signaling, the UE is configured by LTE CRS vshift(s), which is an offset value for a specific RE, the number of LTE CRS ports, and LTE carrier center frequency location information, which is an offset value from the reference point A from the base station. When the UE receives the corresponding higher signal configuration, the UE receives data in the remaining scheduled PDSCH resource areas except for the corresponding resource area. As an example, when the UE receives the LTE CRS-related configuration information through a higher signal before receiving the PDCCH 921 scheduling the PDSCH 925, upon reception of the PDSCH 925, the UE receives data in the remaining resource areas except for REs 930 used for LTE CRS in the scheduled PDSCH resource area.

ZP (zero-power) CSI-RS: includes ZP-CSI-RS frequency and time resource area and antenna port number, CDM value and pattern, and transmission period and slot offset information configured through higher signal. The base station may inform that the RE level resource area related to periodic or quasi-periodic ZP CSI-RSs is not used for PDSCH transmission through higher layer signaling. On the other hand, for aperiodic ZP CSI-RS, the UE may receive up to three aperiodic ZP CSI-RS resource pattern areas configured by the BWP, and may be dynamically instructed whether or not the resource pattern area is used for PDSCH transmission by using 2 bits by non-fallback DCI format 1_1 from the base station. In the case of a PDSCH or SPS PDSCH indicated by fallback DCI, the UE determines that a resource area related to aperiodic ZP CSI-RS is used for the PDSCH.

The above-described information is rate matching pattern information and may be configured for each cell, for each BWP, or for each TRP (or TCI state).

Figure 10:
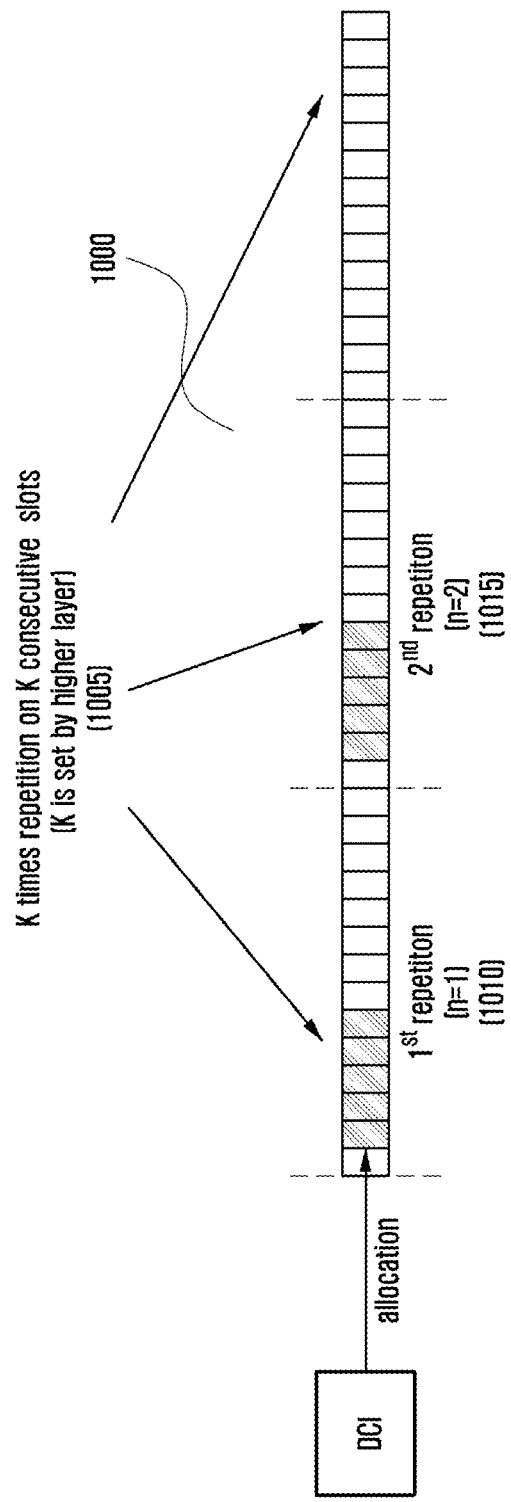
FIG. 10 is a diagram illustrating an example of repeated transmission (slot aggregation) for each slot according to some embodiments in a wireless communication system according to an embodiment of the disclosure.

FIG. 10 is a diagram illustrating an example of repeated transmission (slot aggregation) for each slot according to some embodiments in a wireless communication system according to an embodiment of the disclosure.

Referring to FIG. 10, in the NR system, repeated transmission of the same PDSCH is supported in order to improve the PDSCH reception reliability of the UE 1000. The base station may set the number of repeated PDSCH transmissions, e.g., pdsch-AggregationFactor in PDSCH-Config, through a higher layer such as RRC, and when the number of repeated transmissions is set, the PDSCH scheduled by DCI may be repeatedly transmitted in the same number of slots as the number of consecutive repeated transmissions 1005. All PDSCHs that are repeatedly transmitted may be allocated the same time resource within a slot, which may be an OFDM symbol start location and length within one slot indicated by DCI, as illustrated in FIG. 7. In addition, it may be assumed that the same transport block (TB) is transmitted to all PDSCHs that are repeatedly transmitted. The UE may expect that the repeatedly transmitted PDSCH is transmitted only through a single layer. In addition, the redundancy version (RV) of the repeatedly transmitted PDSCH may be determined according to the redundancy version (RV) value indicated in the DCI scheduling the PDSCH and the index of the repeatedly transmitted PDSCH as illustrated in Table 16 below.

TABLE 16

| rvid indicated by the DCI scheduling the PDSCH | rvid to be applied to nth transmission occasion | | | |
|---|---|---|---|---|
| | 0 | 2 | 3 | 1 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In Table 16, n may indicate an index for each PDSCH within the number of repeated transmissions determined by the higher layer 1010 and 1015.

Referring to the above-described DCI structure, PDSCH time and frequency resource allocation, and descriptions related to PDSCH transmission and reception procedures performed based thereon, in Release 15, the NR system supports only transmission using a single transmission point (may be used interchangeably with transmission and reception point (TRP), panel, or beam) when repeatedly transmitting the PDSCH.

Unlike the existing system, 5G wireless communication system can support all of a service requiring a high transmission rate, a service having a very short transmission delay, and a service requiring a high connection density. In a wireless communication network including a plurality of cells, TRPs, or beams, a coordinated transmission between each cell, TRP, and/or beam is one of element technologies that can satisfy various service requirements by increasing the strength of a signal received by the UE or efficiently performing interference control between each cell, TRP, and/or beam. If cooperative communication using multiple transmission points can be applied during repeated PDSCH transmission, it is expected that more robust performance may be obtained for channel blockage, etc., so a repeated transmission scheme through multiple transmission points is being actively discussed. At this time, in order to improve the reception reliability of the UE, it is necessary to combine the TRP and/or the transmission signal for each beam.

Embodiments of the disclosure will be described in detail with reference to the accompanying drawings. In addition, in describing the disclosure, if it is determined that a detailed description of a related function or configuration may unnecessarily obscure the gist of the disclosure, the detailed description thereof will be omitted. In addition, the terms to be described later are terms defined in consideration of functions in the disclosure, which may vary according to intentions or customs of users and operators. Therefore, the definition should be made based on the content throughout the disclosure.

Although an embodiment of the disclosure will be described below using an NR or LTE/LTE-A system as an example, the embodiment of the disclosure may be applied to other communication systems having a similar technical background or channel type. In addition, the embodiments of the disclosure may be applied to other communication systems through some modifications within a range that does not significantly depart from the scope of the disclosure as judged by a skilled person having technical knowledge.

The contents of the disclosure are applicable to FDD and TDD systems.

In the disclosure, higher signaling (or higher signal, higher layer signaling, higher layer configuration, higher layer, etc. may be mixed) is a signal transmission method in which a base station transmits to a UE using a downlink data channel of a physical layer, or a UE transmits to a base station using an uplink data channel of a physical layer, and may also be referred to as RRC signaling, PDCP signaling, or medium access control (MAC) control element (MAC CE).

In the disclosure, the L1 signal is a type of signal transmitted from the base station to the UE in the physical layer, and may be interpreted as a specific field in DCI, DCI format, RNTI scrambled to CRC of DCI, CORESET in which DCI is transmitted, or search space. Therefore, to be distinguished by the L1 signal means to be distinguished through the above examples.

In the disclosure, in determining whether to apply cooperative communication, the UE may use various methods, such as PDCCH (s) allocating PDSCH to which cooperative communication is applied has a specific format, the PDCCH(s) allocating the PDSCH to which the cooperative communication is applied includes a specific indicator indicating whether cooperative communication is applied, PDCCH(s) allocating PDSCH to which cooperative communication is applied is scrambled by a specific RNTI, or assuming that cooperative communication is applied in a specific section indicated by a higher layer. In addition, cooperative communication application may be possible when the UE reports that cooperative communication is applied by UE capability report or higher layer signaling. Hereinafter, for convenience of description, a case in which a UE receives a PDSCH to which cooperative communication is applied based on similar conditions will be referred to as a non-coherent joint transmission (NC-JT) case.

In the disclosure, determining the priority between A and B may refer to selecting the one having a higher priority according to a predetermined priority rule and performing the corresponding operation or omit or drop the operation with the lower priority, etc.

In the disclosure, the above examples are described through a plurality of embodiments, but these are not independent, and it is possible that one or more embodiments may be applied simultaneously or in combination.

Next, the cooperative communication is described in detail. Joint transmission (JT) is a representative transmission technology for cooperative communication described above, and through the joint transmission technology, one UE is supported through different cells, TRPs, and/or beams to increase strength of a signal received by the UE. On the other hand, because the characteristics of each cell, TRP and/or the channel between the beam and the UE may be significantly different, different precoding, MCS, resource allocation, etc. need to be applied to the link between each cell, TRP and/or beam and the UE. In particular, in the case of non-coherent joint transmission (NC-JT), which supports non-coherent precoding between each cell, TRP and/or beams, it is important to configure individual down link transmission information for each cell, TRP, and/or beams. This individual DL transmission information configuration for each cell, TRP, and/or beam becomes a major factor in increasing the payload required for DL DCI transmission, which may adversely affect reception performance of PDCCH transmitting DCI. Therefore, it is necessary to carefully design a tradeoff between the amount of DCI information and the PDCCH reception performance to support JT.

Figure 11:
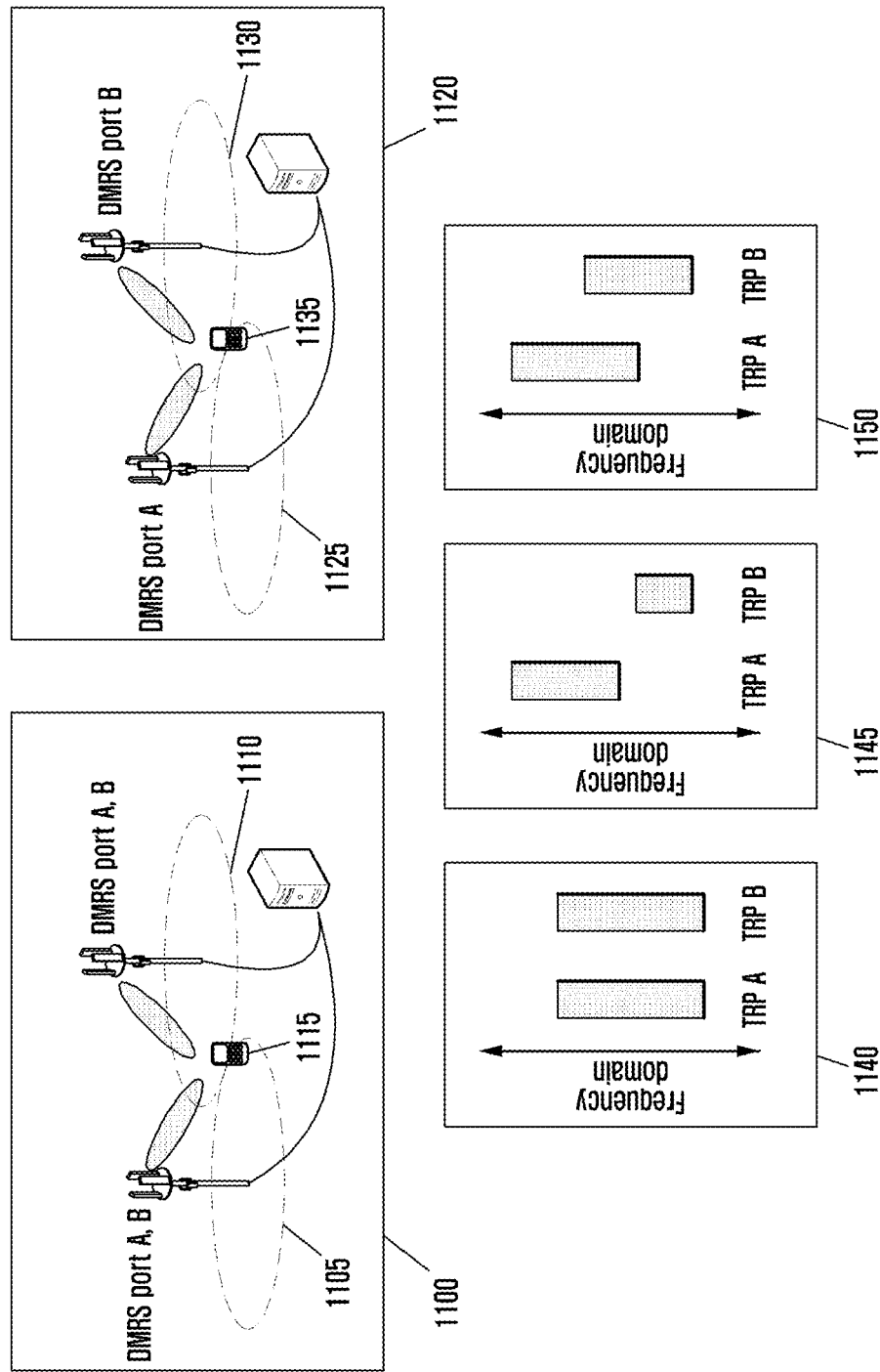
FIG. 11 is a diagram illustrating an example of an antenna port configuration and resource allocation for cooperative communication according to some embodiments in a wireless communication system according to an embodiment of the disclosure.

FIG. 11 is a diagram illustrating an example of an antenna port configuration and resource allocation for cooperative communication according to some embodiments in a wireless communication system according to an embodiment of the disclosure.

Referring to FIG. 11, examples of radio resource allocation for each TRP according to a joint transmission technique and situation are illustrated. 1100 is an example of coherent joint transmission (C-JT) supporting coherent precoding between each cell, TRP and/or beam. In C-JT, single data (PDSCH) is transmitted from TRP A 1105 and TRP B 1110 to the UE 1115, and joint precoding is performed in multiple TRPs. This refers to that data is transmitted using the same DMRS ports (e.g., DMRS ports A and B in both TRPs) for receiving the same PDSCH in TRP A 1105 and TRP B 1110. In this case, the UE may receive one piece of DCI information for receiving one PDSCH demodulated by DMRS ports A and B.

1120 is an example of non-coherent joint transmission (NC-JT) supporting non-coherent precoding between each cell, TRP and/or beam. In the case of NC-JT, a PDSCH is transmitted to the UE 1135 for each cell, TRP, and/or beam, and individual precoding may be applied to each PDSCH. Each cell, TRP and/or beam transmits a different PDSCH to improve throughput compared to single cell, TRP and/or beam transmission, or each cell, TRP and/or beam repeatedly transmits the same PDSCH, and it is possible to improve reliability compared to single cell, TRP and/or beam transmission.

Various radio resource allocation may be considered such as a case when all of the frequency and time resources used by multiple TRPs for PDSCH transmission are the same 1140, a case when the frequency and time resources used by multiple TRPs do not overlap 1145 at all, and a case when some of the frequency and time resources used by multiple TRPs overlap 1150. In each case of the aforementioned radio resource allocation, when multiple TRPs repeatedly transmit the same PDSCH to improve reliability, if the receiving UE does not identify whether the corresponding PDSCH is repeatedly transmitted, there may be a limit to reliability improvement because the UE cannot perform combining in the physical layer for the corresponding PDSCH. Therefore, the UE should be able to identify the frequency and time resources each used by multiple TRPs during repeated transmission of the PDSCH.

In order to simultaneously allocate a plurality of PDSCHs to one UE to support NC-JT, DCIs of various types, structures, and relationships may be considered.

Figure 12:
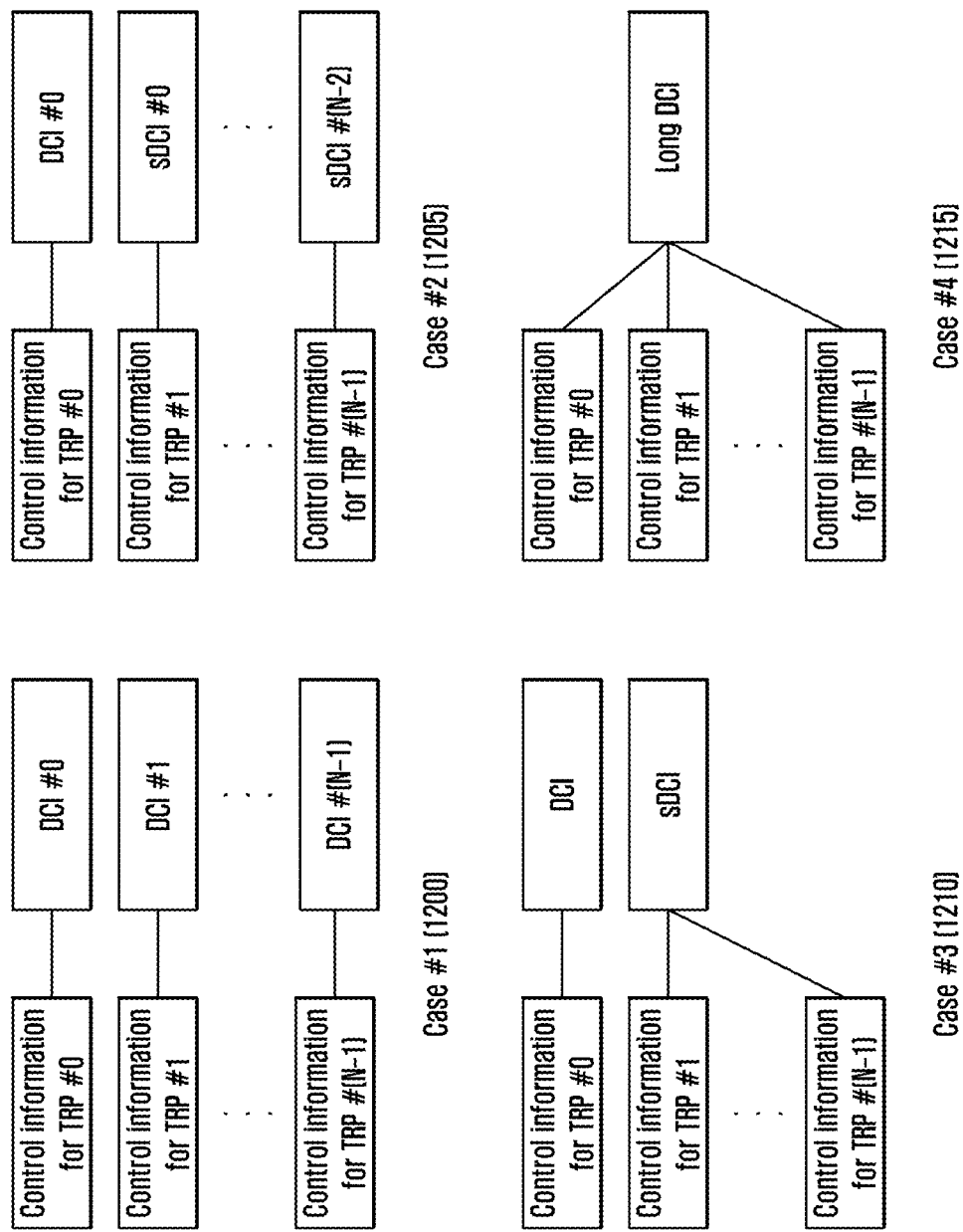
FIG. 12 is a diagram illustrating an example of configuring downlink control information for cooperative communication in a wireless communication system according to an embodiment of the disclosure.

FIG. 12 is a diagram illustrating an example of DCI configuration for cooperative communication in a wireless communication system according to an embodiment of the disclosure. Referring to FIG. 12, four examples of DCI design to support NC-JT are illustrated.

Case #1 1200 is an example in which control information for PDSCH transmitted in N−1 additional TRPs is transmitted in the same form (same DCI format) as control information for PDSCH transmitted in serving TRP in a situation where N−1 different PDSCHs are transmitted in N−1 additional TRPs (TRP #1 to TRP #(N−1)) in addition to the serving TRP (TRP #0) used for single PDSCH transmission. That is, the UE may obtain control information for PDSCHs transmitted in different TRPs (TRP #0 to TRP #(N−1)) through DCIs (DCI #0 to DCW(N−1)) having the same DCI format and the same payload. In the case #1, each PDSCH control (allocation) degree of freedom may be completely guaranteed, but when each DCI is transmitted in different TRPs, a coverage difference for each DCI may occur and reception performance may deteriorate.

Case #2 1205 is an example in which control information for PDSCH transmitted in N−1 additional TRPs is transmitted in a different form (different DCI format or different DCI payload) from control information for PDSCH transmitted in serving TRP in a situation where N−1 different PDSCHs are transmitted in N−1 additional TRPs (TRP #1 to TRP #(N−1)) in addition to the serving TRP (TRP #0) used for single PDSCH transmission. For example, in the case of DCI #0, which is control information for PDSCH transmitted in the serving TRP (TRP #0), all information elements of DCI format 1_0 to DCI format 1_1 are included, but in the case of shortened DCIs (hereinafter sDCI) (sDCI #0 to sDCI # (N−2)), which are control information for PDSCHs transmitted in the cooperative TRP (TRP #1 to TRP # (N−1)), only some of the information elements of DCI format 1_0 to DCI format 1_1 may be included. Therefore, in the case of sDCI transmitting control information for PDSCHs transmitted in the cooperative TRP, it is possible to include reserved bits as much as the payload is small compared to normal DCI (nDCI) for transmitting PDSCH-related control information transmitted in the serving TRP, or the number of bits lacking compared to nDCI. In the case

2, each PDSCH control (allocation) degree of freedom may be limited according to the contents of information elements included in sDCI, but because the reception performance of sDCI is superior to that of nDCI, the probability of a difference in coverage for each DCI may be lowered.

Case #3 1210 is another example in which control information for PDSCH transmitted in N−1 additional TRPs is transmitted in a different form (different DCI format or different DCI payload) from control information for PDSCH transmitted in serving TRP in a situation where N−1 different PDSCHs are transmitted in N−1 additional TRPs (TRP #1 to TRP #(N−1)) in addition to the serving TRP (TRP #0) used for single PDSCH transmission. For example, in the case of DCI #0, which is control information for PDSCH transmitted in the serving TRP (TRP #0), all information elements of DCI format 1_0 to DCI format 1_1 are included, and in the case of the control information for PDSCHs transmitted in the cooperative TRP (TRP #1 to TRP #(N−1)), only some of the information elements of DCI format 1_0 to DCI format 1_1 may be collected and transmitted in one secondary DCI (sDCI).

For example, the sDCI may include at least one of HARQ-related information such as frequency domain resource assignment of cooperative TRPs, time domain resource assignment, and MCS. In addition, in the case of information not included in the sDCI, such as a bandwidth part (BWP) indicator or a carrier indicator, DCI (DCI #0, normal DCI, nDCI) of the serving TRP may be followed. In the case #3, each PDSCH control (allocation) degree of freedom may be limited according to the contents of the information element included in sDCI, but sDCI reception performance may be adjusted and the complexity of DCI blind decoding of the UE may be reduced compared to the case #1 or case #2.

Case #4 1215 is an example in which control information for PDSCH transmitted in N−1 additional TRPs is transmitted from the same DCI (long DCI, lDCI) as control information for PDSCH transmitted in serving TRP in a situation where N−1 different PDSCHs are transmitted in N−1 additional TRPs (TRP #1 to TRP #(N−1)) in addition to the serving TRP (TRP #0) used for single PDSCH transmission. That is, the UE may obtain control information for PDSCHs transmitted in different TRPs (TRP #0 to TRP #(N−1)) through a single DCI. In the case #4, the complexity of DCI blind decoding of the UE may not increase, but the PDSCH control (allocation) degree of freedom may be low, such as the number of cooperative TRPs being limited according to long DCI payload restrictions.

In the following description and embodiments, sDCI may refer to various auxiliary DCIs such as shortened DCI, secondary DCI, or normal DCI (the aforementioned DCI format 1_0 to 1_1) including PDSCH control information transmitted in cooperative TRP, and if no special restrictions are specified, the description is similarly applicable to various auxiliary DCIs.

In the following description and embodiments, the above-described case #1, case #2, and case #3 in which one or more DCIs (PDCCH) are used to support NC-JT may be distinguished as multiple PDCCH-based NC-JTs (or cooperative communication based on multiple DCIs), and the above-described case #4 in which a single DCI (PDCCH) is used for NC-JT support may be distinguished as a single PDCCH-based NC-JT (cooperative communication based on single DCI).

In embodiments of the disclosure, the cooperative TRP may be replaced with various terms such as the cooperative panel or the cooperative beam when actually applied.

In the embodiments of the disclosure, when NC-JT is applied may be interpreted variously according to the situation, such as when a UE receives one or more PDSCHs at the same time in one BWP, when a UE receives the PDSCH based on two or more transmission configuration indicator (TCI) indications at the same time in one BWP, when the PDSCH received by the UE is associated with one or more DMRS port groups, etc., but for convenience of explanation, one expression has been used.

In the disclosure, the radio protocol structure for NC-JT may be used in various ways according to TRP deployment scenarios. As an example, if there is no or small backhaul delay between cooperative TRPs, it is possible to use a structure based on MAC layer multiplexing. This may be understood as a carrier aggregation-like method. On the other hand, when the backhaul delay between cooperative TRPs is so large that it cannot be ignored (for example, when the exchange of channel state information or scheduling information between cooperative TRPs requires more than 2 ms), it is possible to secure a characteristic strong against delay by using an independent structure for each TRP from the RLC layer. This may be understood as a dual connectivity-like method.

FIGS. 13A, 13B, 13C, and 13D are a diagrams illustrating an example of repeated transmission by multiple TRPs to which various resource allocation methods are applied in a wireless communication system according to an embodiment of the disclosure. FIGS. 13A, 13B, 13C, and 13D illustrate an example in which two or more TRPs repeatedly transmit the same PDSCH.

Figure 13A:
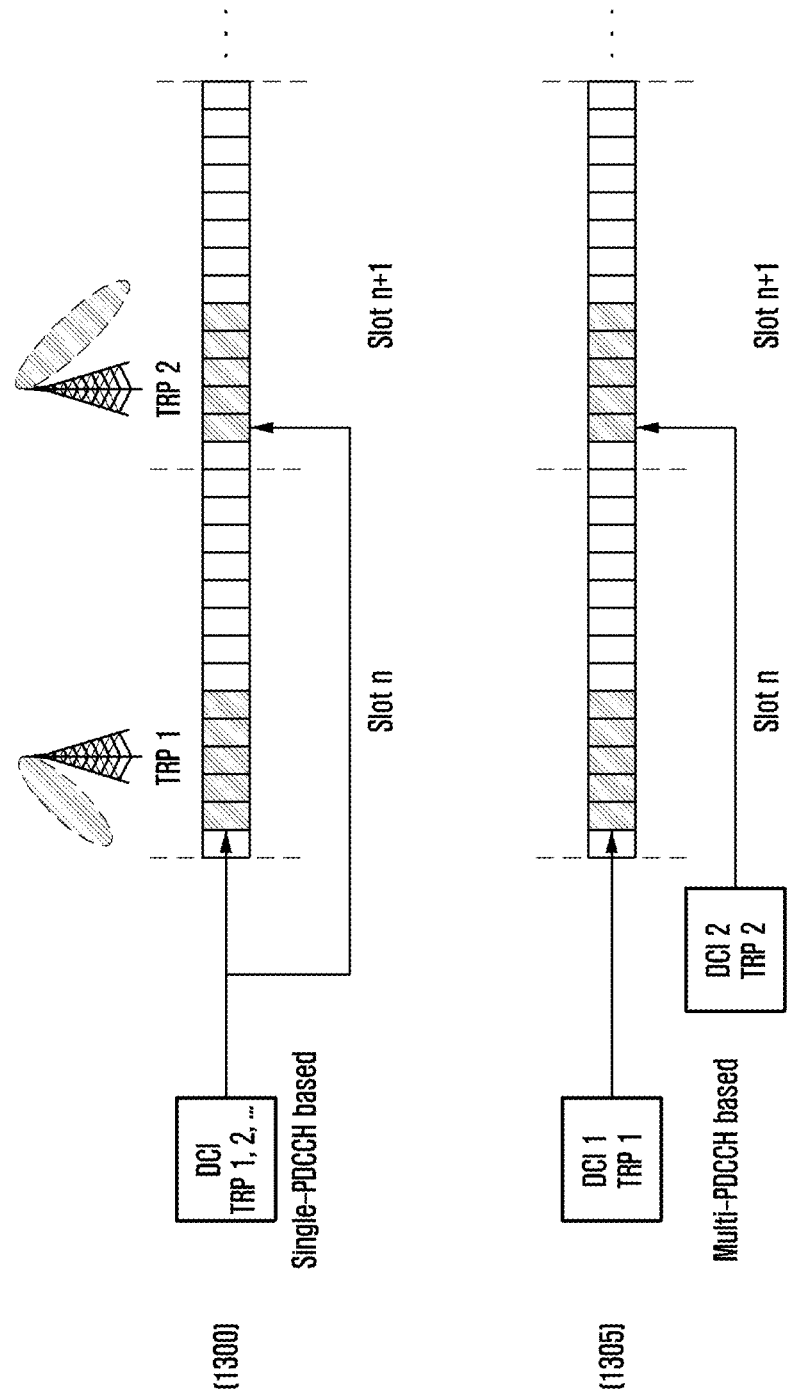
FIG. 13A is a diagram illustrating an example of repeated PDSCH transmission using multiple TRPs.

FIG. 13A is a diagram illustrating an example of repeated PDSCH transmission using multiple TRPs. In the current NR system, as described above, the number of slots equal to the number of repeated transmissions is required to repeatedly transmit the same PDSCH, and the same cell, TRP, and/or beam is used for each repeated transmission. On the other hand, as in 1300 and 1305, different TRPs are used for each repeated transmission in each slot, so that higher reliability may be achieved. At this time 1300 is an example in which a single DCI schedules both PDSCH repeated transmissions in TRP 1 and 2, and 1305 is an example in which a plurality of DCIs corresponding to TRPs 1 and 2 respectively schedule repeated PDSCH transmission transmitted in each TRP.

Figure 13B:
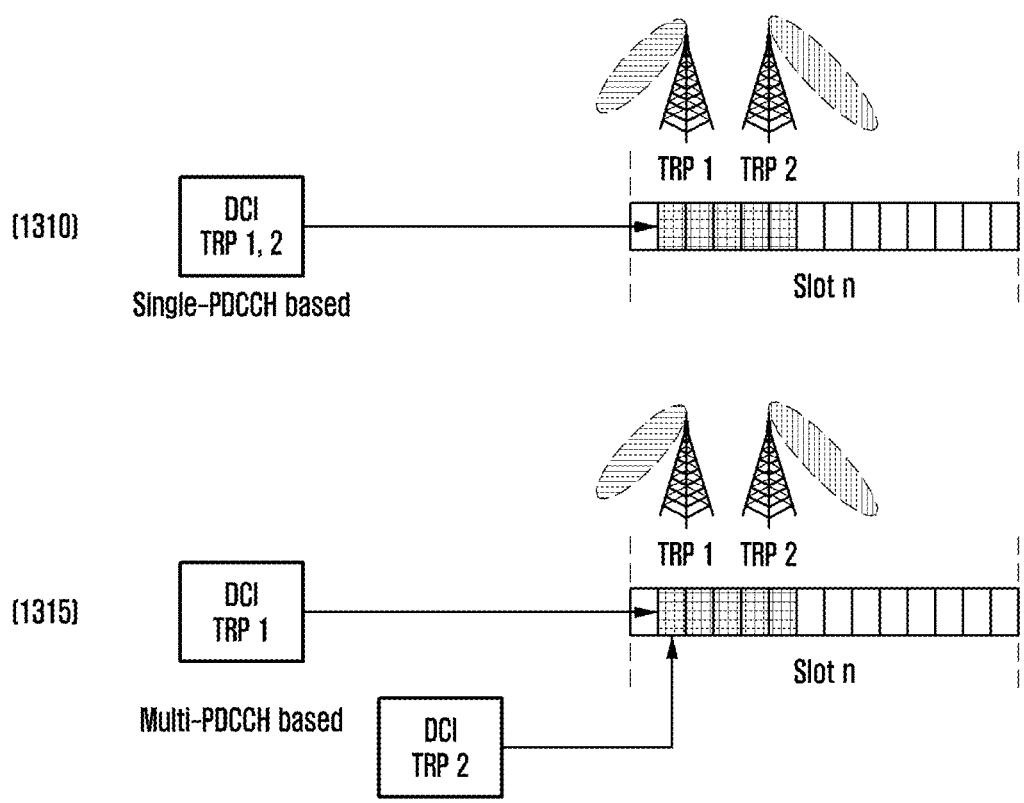
FIG. 13B is a diagram illustrating another example of repeated PDSCH transmission using multiple TRPs.

On the other hand, other repeated transmission methods may be used depending on the UE's capability and delay time requirements, the state of available resources between TRPs, and the like. FIG. 13B is a diagram illustrating another example of repeated PDSCH transmission using multiple TRPs. For example, if the UE has the capability to receive NC-JT, each TRP may increase the frequency resource utilization rate and reduce the delay time required for PDSCH decoding by using a method of transmitting the same PDSCH in the same time and frequency resource 1310 and 1315. At this time 1310 is an example in which a single DCI schedules both PDSCH repeated transmissions in TRP 1 and 2, and 1315 is an example in which a plurality of DCIs corresponding to TRPs 1 and 2 respectively schedule repeated PDSCH transmission transmitted in each TRP. This method is effective when the beams between TRPs to be transmitted simultaneously are close to orthogonal to each other, so there is little interference between the beams.

Figure 13C:
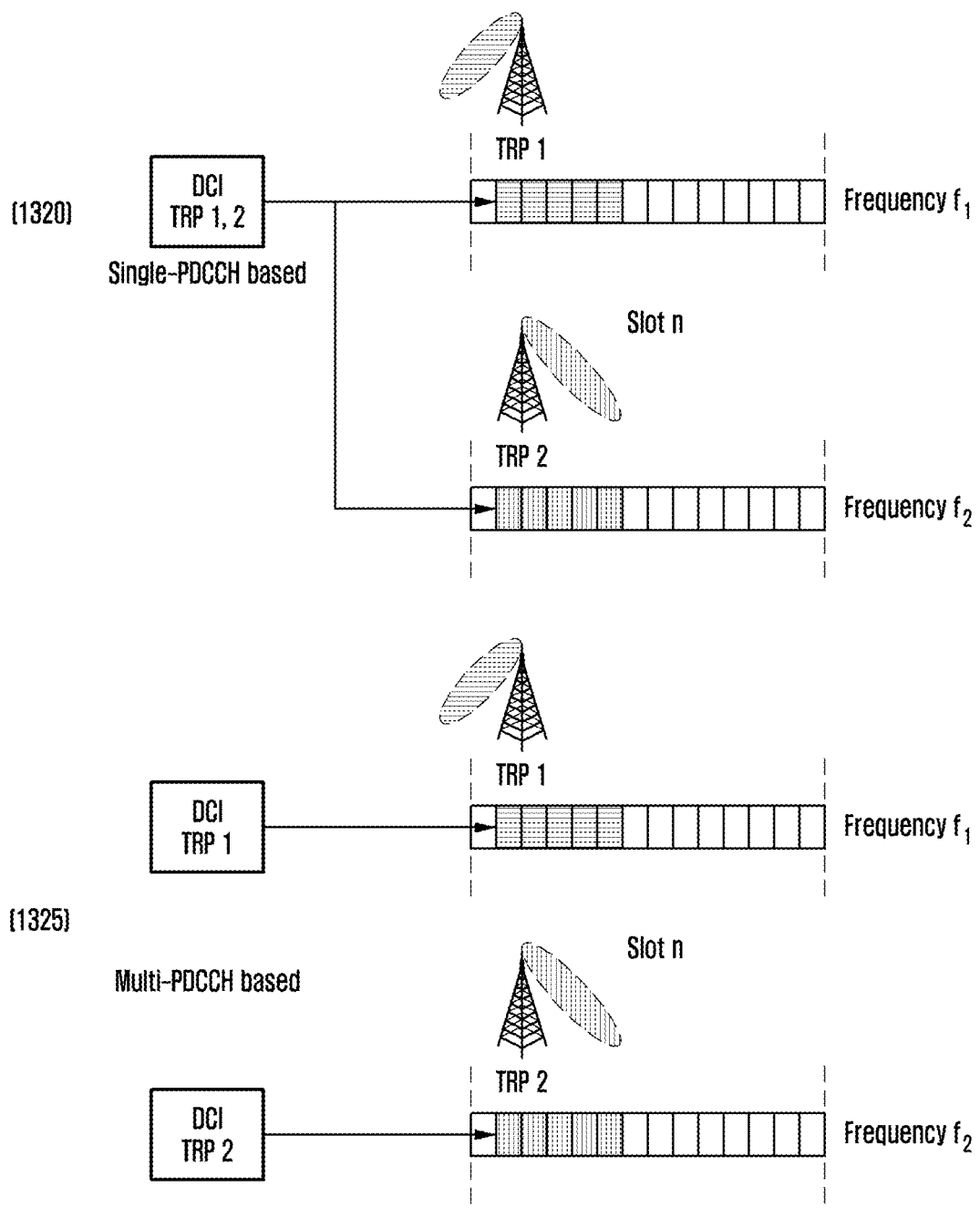
FIG. 13C is a diagram illustrating another example of repeated PDSCH transmission using multiple TRPs.

FIG. 13C is a diagram illustrating another example of repeated PDSCH transmission using multiple TRPs. For another example, each TRP may use a method of transmitting the same PDSCH in the same time resource and the frequency resource that do not overlap with each other 1320 and 1325. At this time 1320 is an example in which a single DCI schedules both PDSCH repeated transmissions in TRP 1 and 2, and 1325 is an example in which a plurality of DCIs corresponding to TRPs 1 and 2 respectively schedule repeated PDSCH transmission transmitted in each TRP. This method is effective when the inter-beam interference of TRPs to be transmitted simultaneously is large and there are many available frequency resources of each TRP.

Figure 13D:
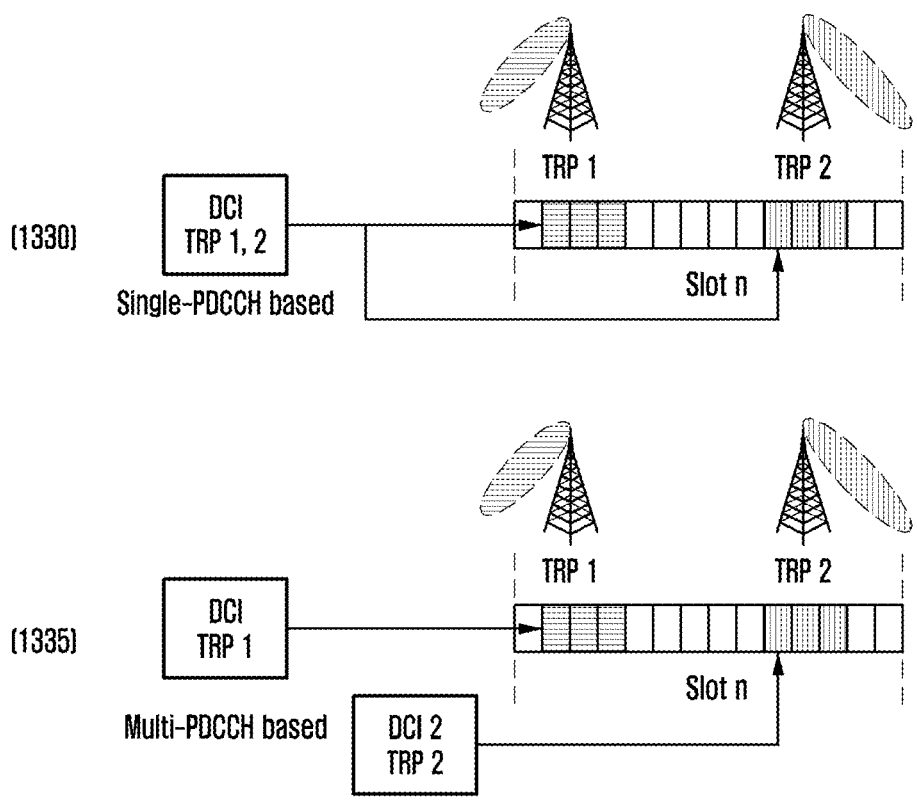
FIG. 13D is a diagram illustrating another example of repeated PDSCH transmission using multiple TRPs.

FIG. 13D is a diagram illustrating another example of repeated PDSCH transmission using multiple TRPs. For another example, each TRP may use a method of transmitting the same PDSCH in different OFDM symbols within the same slot 1330 and 1335. At this time 1330 is an example in which a single DCI schedules both PDSCH repeated transmissions in TRP 1 and 2, and 1335 is an example in which a plurality of DCIs corresponding to TRPs 1 and 2 respectively schedule repeated PDSCH transmission transmitted in each TRP. This method is effective when there are not many frequency resources available for each TRP and the data size to be transmitted is small. In addition to the above-described methods, modifications based on the above-described methods may be possible.

In the above-described methods, a single DCI may be used to schedule repeated transmission 1300, 1310, 1320, and 1330, and the DCI may indicate a list of all TRPs to participate in repeated transmission. The list of TRP to be repeatedly transmitted may be indicated in the form of a TCI state list, and the length of the TCI state list may be dynamically changed. The corresponding DCI may be repeatedly transmitted to improve reliability, and a different beam may be applied to each DCI during repeated transmission.

Alternatively, multiple DCIs may be used to schedule repeated transmission 1305, 1315, 1325, and 1335, and each DCI may correspond to a PDSCH of a different TRP to participate in repetitive transmission. The TRP for each DCI may be indicated in the form of a TCI state or a resource used for repeated transmission, and a more detailed description will be given in an embodiment to be described later. Alternatively, the sDCI described in FIG. 11 may be used to schedule repetitive transmission, and each of normal DCI and sDCI may correspond to a PDSCH of a different TRP to participate in repetitive transmission. The above-described indication method may be commonly applied to both repeated transmission through multiple TRPs and different data transmission through multiple TRPs.

The embodiment below was written under the assumption that each cell or TRP or panel or beam is distinguished by a TCI state, but may be applied without limitation in this case. That is, when each cell, TRP, panel, or beam is distinguished based on a different type of index or information, the TCI state described below may be understood as a different type of index or information. In addition, the embodiment below may be applied without being limited to a method in which each cell, TRP, panel, or beam is distinguished.

In addition, although the following embodiment has been described with respect to the case where the base station transmits downlink data, the contents of the following embodiment may be applied even when the UE transmits uplink data.

First Embodiment

Figure 14:
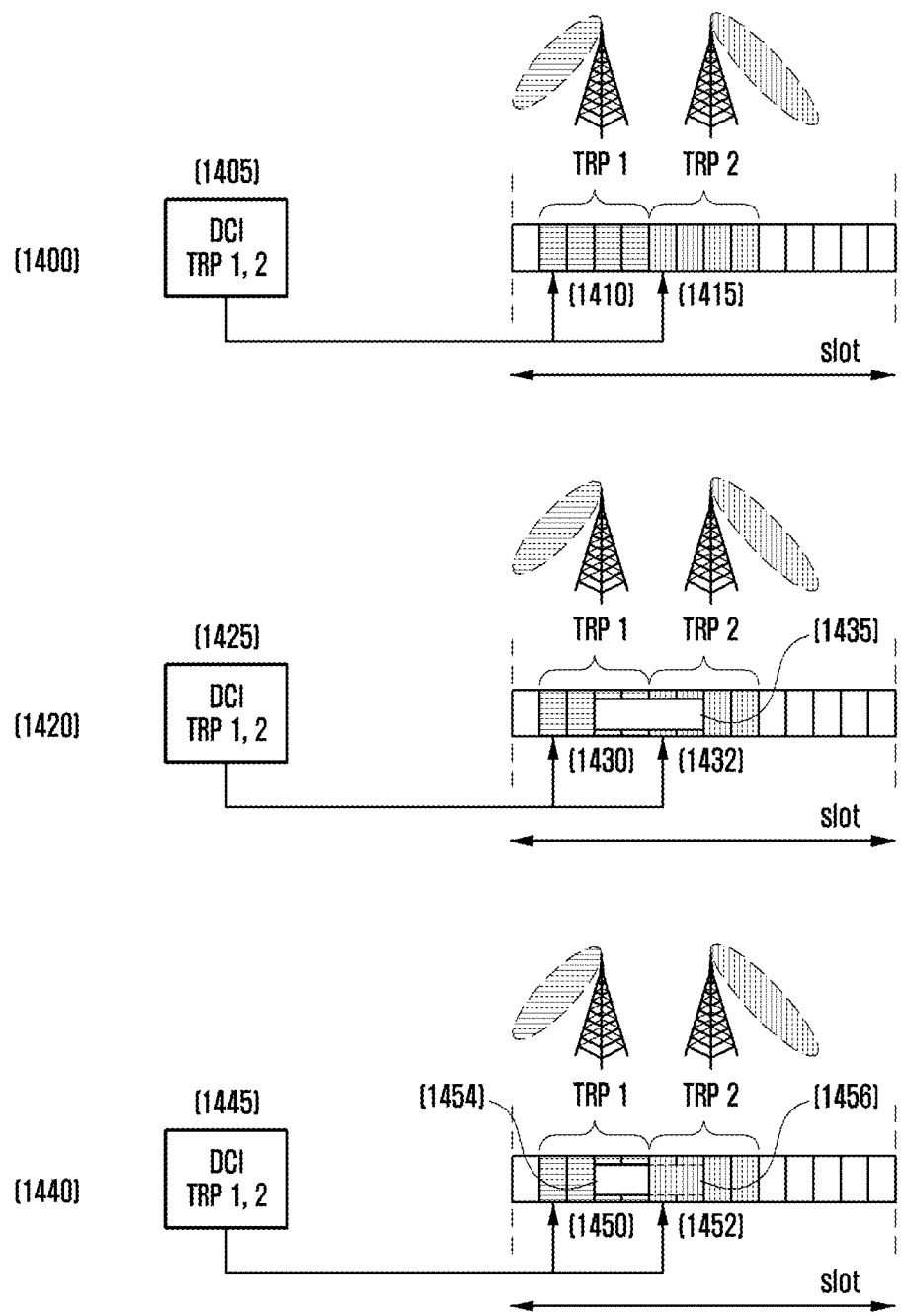
FIG. 14 is a diagram illustrating a PDSCH resource mapping method during repeated transmission using multiple TRPs in a wireless communication system according to a first embodiment of the disclosure.

FIG. 14 is a diagram illustrating a PDSCH resource mapping method during repeated transmission using multiple TRPs in a wireless communication system according to a first embodiment of the disclosure.

1400 is an example in which the base station repeatedly transmits the same PDSCH from different TRPs using a single DCI 1405. TRP 1 transmits the PDSCH 1410 to the UE using the first 4 OFDM symbols, and TRP 2 repeatedly transmits the same PDSCH 1415 to the UE using the next 4 OFDM symbols. After receiving the two PDSCHs, the UE may increase reception reliability through combining. The DCI may be transmitted to the UE from TRP 1 or TRP 2, and as described above with reference to FIG. 13, the DCI information includes information that the PDSCH is repeatedly transmitted through different TRPs. Specifically, time and frequency resource information included in the single DCI may be indicated for each TCI state, or time and frequency resource information common to the TCI state may be included in a single DCI. Optionally, the single DCI includes information indicating an entry of time and frequency resource information configured through higher layer signaling to indicate time and frequency resource information for each TCI state.

Repeated transmission of the same PDSCH of 1400 is only an example, and repeated transmission of PDSCH may be transmitted using different OFDM symbols in one slot or in different slots. In addition, it is also possible that one PDSCH is transmitted over different slots. The single DCI-based multiple TRP-based same PDSCH repeated transmission may be supported in a form having the same slot-based same symbol as described above in FIG. 10 or in a form having different symbols within a slot (or between slots) as described above in FIGS. 13 to 14. This transmission may be configured by a higher signal or an L1 signal.

As described above in FIG. 9, a case in which a specific resource area is not used for scheduled PDSCH transmission by a higher signal or an L1 signal may occur in FIG. 14 as well, and it may be possible to determine the PDSCH mapping assumed by the base station and the UE by at least one of the following three methods.

Method 1: The method 1 is that the RB-symbol level rate matching pattern or the RE level rate matching pattern described above in FIG. 9 is applied to all of the repeated PDSCH transmissions transmitted through different TRPs.

As an example, in a situation in which the same PDSCH is repeatedly transmitted from different TRPs such as 1400, 1420 illustrates an example in which a specific resource area 1435 indicated by the rate matching indicator field included in a single DCI 1425 is not used for repeated transmissions 1430 and 1432 of the same PDSCH from TRP 1 and TRP 2. Alternatively, when the base station informs the UE that the resource area 1435 is not used for PDSCH transmission through a higher signal in advance, the UE may determine that the specific resource area 1435 is not used for repeated transmission of the same PDSCH from TRP 1 and TRP 2 1430 and 1432. Although the method of applying the rate matching pattern in the repeated PDSCH transmission has been described in consideration of the same PDSCH repeated transmission situation, it is sufficiently applicable to the transmission situation of different PDSCHs other than the same PDSCH.

Even if the TRPs in which the PDSCH is repeatedly transmitted are physically located in different places, overlapping time and frequency resource areas may be used, so it may be advantageous for a rate matching pattern to be commonly applied to all TRPs according to the method 1 to minimize interference to a UE using LTE or other NR services for other purposes.

Method 2: The method 2 is that the RB-symbol rate matching pattern or RE level rate matching pattern described above in FIG. 9 is limitedly applied to PDSCHs transmitted from a specific TRP among repeated PDSCH transmissions transmitted through different TRPs.

For example, in a situation in which the same PDSCH is repeatedly transmitted from different TRPs like 1400, although the base station informs the UE that the specific resource areas 1454 and 1456 are not used for PDSCH transmission through the rate matching indicator field included in the single DCI 1445 transmitted from TRP 1, in actual PDSCH transmission, 1440 illustrates that only a specific resource area 1454 overlapping with the resource area of the PDSCH transmitted in TRP 1 is not used for the PDSCH 1450 transmission, but another specific resource area 1456 which overlaps with the transmitted PDSCH 1452 is used for PDSCH transmission in TRP 2.

Alternatively, in a situation where there is no rate matching indicator field in the single DCI 1445, but the specific resource areas 1454 and 1456 are configured as a rate matching resource by the higher signal configuration associated with TRP 1, when the PDSCH overlaps with the specific resource areas 1454 and 1456 only for the PDSCH transmitted from TRP 1, the overlapping PDSCH resource area is not used for PDSCH transmission. In other words, for PDSCHs transmitted in a TRP other than TRP 1, even if the PDSCH overlaps the specific resource areas 1454 and 1456, the specific resource areas are used for PDSCH transmission.

The method 2 is advantageous in that the rate matching pattern may be limitedly applied only to the PDSCH transmitted by the specific TRP in order to minimize interference to the UE using LTE or other NR services only where the TRP is located.

When the method 2 is viewed from the viewpoint of the TCI state, if the TCI state of the PDCCH to which the DCI 1445 scheduling (or including the rate matching indicator field) the PDSCH belongs is the same as the TCI state of the corresponding PDSCH 1450, the UE determines that the resource area indicated by the rate matching information (information that a specific resource area is not used for PDSCH transmission and reception) 1454 exist in the DCI is not used for the PDSCH 1450 transmission. If the TCI state of the PDCCH to which the DCI 1445 scheduling (or including the rate matching indicator field) the PDSCH belongs is different from the TCI state of the corresponding PDSCH 1452, the UE determines that the resource area 1456 indicated by the rate matching information exist in the DCI is used for the PDSCH 1452 transmission.

Alternatively, if a rate-matching resource area configured with a higher signal is associated with a specific one or a plurality of TCI state values, the UE determines whether the TCI state of PDSCH scheduled by DCI based on the higher signal information (without the need to check the TCI state information of the PDCCH to which the received DCI belongs) is the same as (or belongs to) or different from (or does not belong to) the TCI state for rate matching information configured through the higher signal. If the TCI states are the same, the UE does not use a rate-matched resource in the scheduled PDSCH resource area for PDSCH reception. If the TCI states are different, the UE uses a rate-matched resource in the scheduled PDSCH resource area for PDSCH reception.

The determination of the TCI state associated with the DCI is determined by the TCI state in the CORESET higher signal information for the PDCCH to which the DCI belongs, as illustrated in Table 4. The determination of the TCI state associated with the PDSCH is determined by the transmission configuration indication field in the DCI for scheduling the PDSCH. In the case of repeated PDSCH transmission by a single DCI, one or more values of different TCI states for each repeatedly transmitted PDSCH are determined by the transmission configuration indication field. For example, when the transmission configuration indication field is 3 bits, a total of 8 indexes may indicate different TCI state(s), and a specific index among 8 indexes may indicate two or more TCI states. Table 17 below is a table illustrating an example of this.

TABLE 17

| TCI index | Set of TCI state |
|---|---|
| 1 | TCI state ID 1 |
| 2 | TCI state ID 1, TCI state ID 4 |
| 3 | TCI state ID 5, TCI state ID 10 |
| 4 | TCI state ID 5, TCI state ID 2 |
| . . . | . . . |

For example, in Table 17, when the DCI field TCI index indicates 2, it is assumed that the UE determines that repeated PDSCH transmission/reception is performed, and that the first PDSCH is transmitted based on TCI state ID 1 and the second PDSCH is transmitted based on TCI state ID 4.

In Table 17, the Set of TCI state is determined by the RRC higher signal and/or the MAC higher signal, the size of the set of IDs of the TCI state for a specific row may be the number of repeated PDSCH transmissions, and the arrangement order of the TCI state ID may be the TCI state value of the repeatedly transmitted PDSCH (method A). Alternatively, the TCI state of the PDSCH repeatedly transmitted in ascending or descending order may be determined regardless of the arrangement order of the TCI state IDs (method B). For example, in Table 17, two PDSCHs are repeatedly transmitted and received in a row value corresponding to TCI index 4, and according to method A, the first PDSCH follows TCI state ID 5 and the second PDSCH follows TCI state ID 2. According to method B, the first PDSCH may follow TCI state ID 2, and the second PDSCH may follow TCI state ID 5. Alternatively, the number of PDSCH repeated transmissions depends on higher layer signaling, and the TCI state IDs of the Set of TCI state may be repeated and applied to repeated PDSCH transmission. The specific meaning of PDSCH conforming to TCI state ID X means that PDSCH DMRS ports of one serving cell are QCLed in terms of RSs and QCL parameters for TCI state ID x. The above description is not limited to the method 2, but may be generally applied to the disclosure.

Method 3: The method 3 is a combination of the method 1 and the method 2, in which two types of specific resource areas (rate matching resources) not used for transmission and reception of PDSCH exist. The first is a rate matching resource commonly applied to all TCI states (or all TRPs) (type A RM resource), and the second is a rate matching resource limitedly applied to a specific TCI state (or a specific TRP) (type B RM resource).

The base station may indicate the type A and type B RM resources through a higher signal, or dynamically inform whether the type A and type B RM resources are used for PDSCH transmission/reception by the L1 signal (DCI) after configuring the higher signal. When configured by only the higher signal, the UE applies the method 1 or the method 2 to a resource for which PDSCH repeated transmission/reception (or single transmission/reception) is performed depending on whether the rate matching resource type is type A or type B. That is, the UE performs the method 1 if it is a type A RM resource, and performs the method 2 if it is a type B RM resource. When indicated by the higher signal and the L1 signal, the UE finally applies the method 1 or the method 2 depending on whether the rate matching resource type indicated by the L1 signal is type A or type B. That is, the UE performs the method 1 if it is type A, and performs the method 2 if it is type B.

When the base station repeatedly transmits the PDSCH in multiple TRPs through the Methods 1 to 3 described above, the base station informs the UE whether or not a specific resource area is used for the PDSCH transmission with a higher signal or an L1 signal, and the UE performs PDSCH reception through this. Specifically, the base station and the UE may transmit and receive data by at least one of the following cases.

Case 1: As an example, one of the methods described above is specified in the 3GPP standard, and the base station and the UE always perform the above operation.

Case 2: The base station informs the UE of at least one of Methods 1 to 3 with a higher signal, and the UE follows the method configured through the higher signal. As an example, the PDSCH scheduled by the fallback DCI format always applies a specific method because the PDSCH scheduled by the fallback DCI format is not affected by the higher signal configuration change, and the PDSCH scheduled by the non-fallback DCI format applies a method indicated according to the higher signal configuration. Alternatively, the base station informs the UE whether or not a specific method is applied when configuring the CORESET or search space higher signal. In addition, the UE determines which method is applied according to the CORESET or search space configuration including the DCI scheduling the PDSCH.

Alternatively, after a method specified in the 3GPP standard or configured as a default, or for each RNTI as a higher signal is configured, the method specified or configured according to the RNTI scrambled in the CRC of the DCI may be applied to the PDSCH scheduled by the DCI.

Case 3: A field indicating the use (or, selection or not selection) of a specific method is included in DCI, so that the base station and the UE perform PDSCH transmission/reception according to the corresponding information.

Case 4: As described above with reference to FIG. 9, the rate matching information is largely divided into information configured only with a higher signal and information dynamically selected by the DCI field after being configured with a higher signal. Accordingly, the UE uses the method 1 for rate matching pattern information configured only with the higher signal, and the method 2 for rate matching information that may be selected by the higher signal and DCI.

Case 5: A method of repeated transmission of the same TB PDSCH transmitted in multiple TRPs by a single DCI may be a time division multiplexing (TDM) scheme in which PDSCHs have different time resources, FDM scheme in which PDSCHs have different frequency resources, or each PDSCH has the same time and frequency resources but different layers. In this situation, if the PDSCHs transmitted in multiple TRPs by a single DCI have the same time and frequency resources, the method 1 may be applied, and if time or frequency resources are different, the method 2 may be applied.

Applying the method to the PDSCH refers to that the UE and the base station determine whether to use the rate matching information for transmission and reception of the PDSCH according to the method described above. In FIG. 14, a method of applying a rate matching pattern when repeated transmission of the same PDSCH is transmitted and received through different symbols within one slot by a single DCI has been mainly described. The same method may be applied when repeated transmission of the same PDSCH is transmitted/received to/from another layer through the same time and/or frequency resource.

Figure 15:
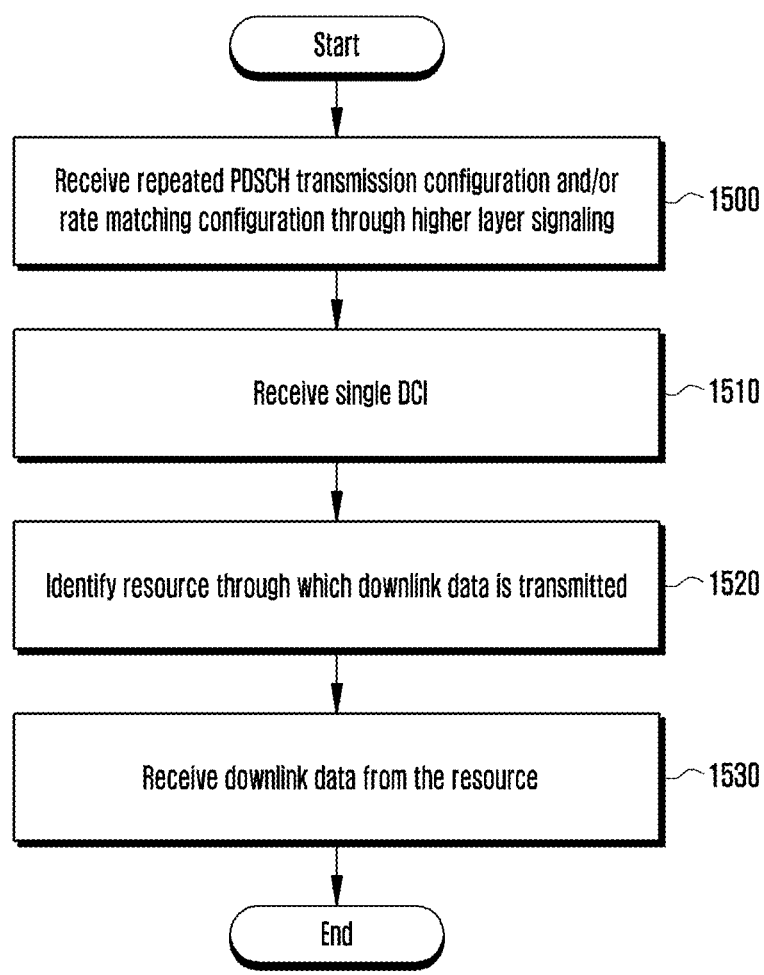
FIG. 15 is a diagram illustrating an operation of a UE performing the first embodiment.

FIG. 15 is a diagram illustrating an operation of a UE performing the first embodiment. According to FIG. 15, the UE receives repeated PDSCH transmission configuration information and/or rate matching resource configuration information through higher layer signaling. In addition, configuration information on the TCI state and configuration information related to PDCCH may also be received through higher layer signaling 1500. The UE receives a single DCI for cooperative communication 1510. The single DCI may be determined to be for cooperative communication by the method described above, and may have the structure of the case #4 described in FIG. 12 as an example.

The UE identifies a resource through which downlink data is received 1520. Specifically, the UE may identify the resource on which the PDSCH (downlink data) is scheduled for each TCI state using the single DCI, and may identify a resource on which PDSCH rate matching is performed among the resources in which the PDSCH is scheduled based on rate matching information determined through higher layer signaling and/or information such as a rate matching indicator and/or TCI state included in a single DCI using one of the methods described above. The UE identifies that downlink data is received from resources other than a resource for which rate matching is performed among resources on which the PDSCH is scheduled. Thereafter, the UE receives downlink data from a resource through which the identified downlink data is transmitted 1530. Each of the steps described above may be omitted, and the order may be changed and performed.

Figure 16:
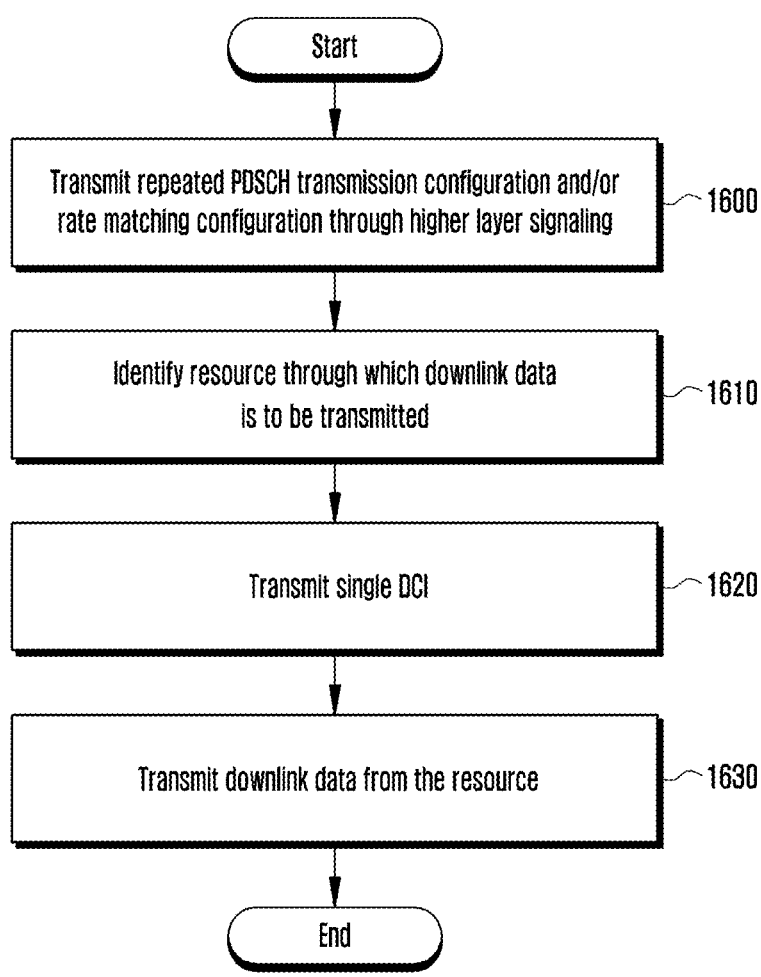
FIG. 16 is a diagram illustrating an operation of a base station performing the first embodiment.

FIG. 16 is a diagram illustrating an operation of a base station performing the first embodiment. According to FIG. 16, the base station transmits repeated PDSCH transmission configuration information and/or rate matching resource configuration information through higher layer signaling. In addition, configuration information on the TCI state and configuration information related to PDCCH may also be transmitted through higher layer signaling 1600. The base station may identify a resource for transmitting downlink data 1610 and generate a single DCI for cooperative communication based on a result of the identification. In this case, the single DCI may include information indicating a resource on which the PDSCH (downlink data) is scheduled, and rate matching indicator and/or TCI state information may be included based on the identification result. The base station transmits a single DCI 1620. For example, the single DCI may have the structure of the case #4 described in FIG. 12. Thereafter, the base station transmits downlink data from a resource through which the downlink data is transmitted 1630. Each of the steps described above may be omitted, and the order may be changed and performed.

Second Embodiment

Figure 17:
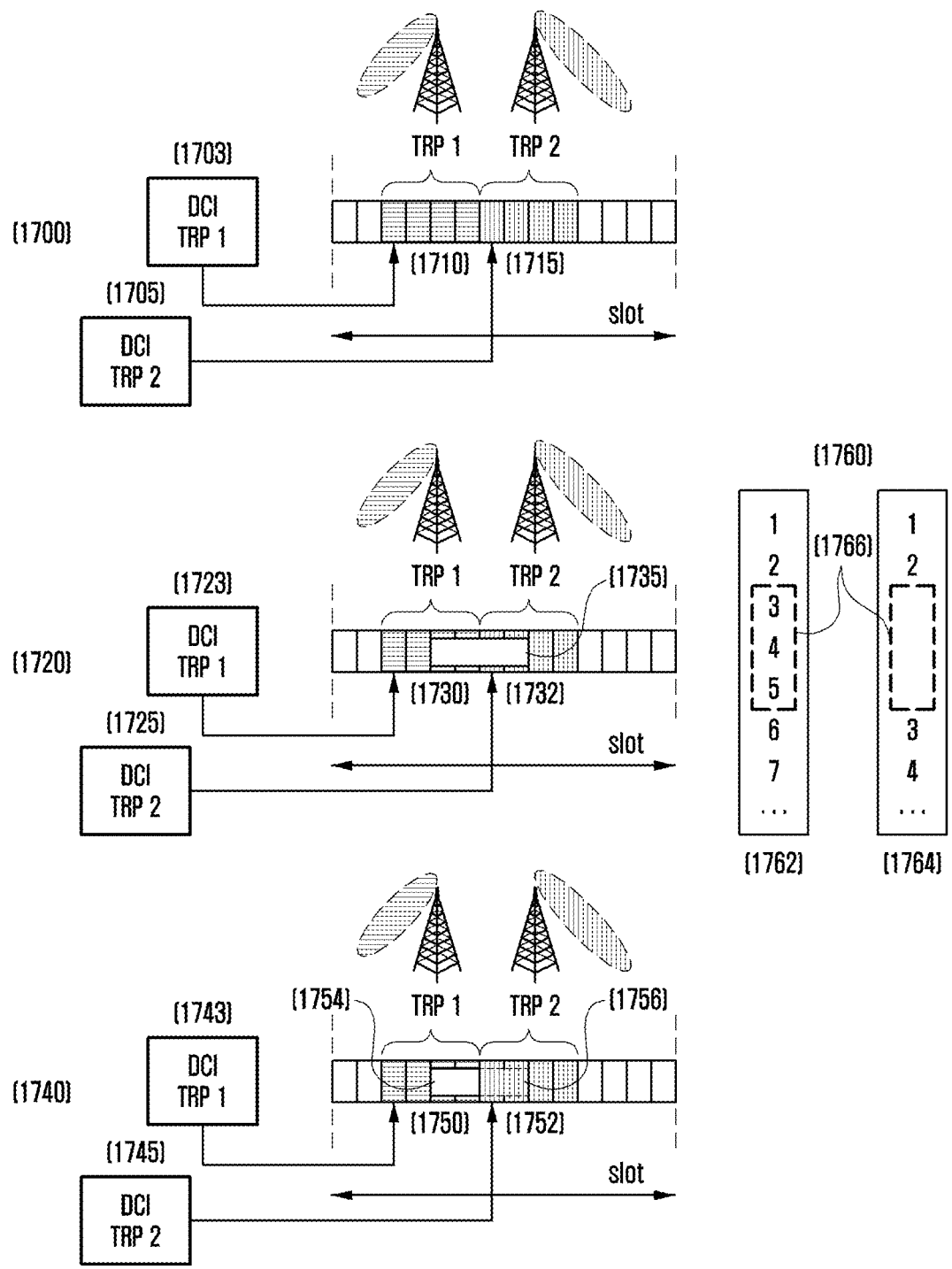
FIG. 17 is a diagram illustrating a PDSCH resource mapping method during repeated transmission using multiple TRPs in a wireless communication system according to a second embodiment of the disclosure.

FIG. 17 is a diagram illustrating a PDSCH resource mapping method during repeated transmission using multiple TRPs in a wireless communication system according to a first embodiment of the disclosure.

1700 is a diagram illustrating an example in which the UE receives a plurality of DCIs and repeatedly receives the same PDSCH from different TRPs. Specifically, the UE receives the scheduled PDSCH 1710 consisting of four OFDM symbols through the DCI 1703 received from TRP 1, and thereafter, receives the scheduled PDSCH 1715 composed of 4 OFDM symbols through the DCI 1705 received from TRP 2. Although the two PDSCHs are scheduled by different DCIs, they carry the same TB. The case where the two PDSCHs have different TBs (i.e., different PDSCHs) is also possible. After receiving the two PDSCHs, the UE may increase the reception reliability through combining in the case of the same TB. Unlike repeated PDSCH transmission by single DCI-based multiple TRPs, in FIG. 17, the TRP in which the DCI is transmitted and the TRP in which the PDSCH scheduled by the DCI is transmitted may be the same TRP. However, as in the case #3 of FIG. 12, a case in which one nDCI and/or sDCI schedules a PDSCH transmitted in a TRP different from the TRP in which the DCI is transmitted is not excluded.

A method of determining whether PDSCHs 1710 and 1715 scheduled in different DCIs 1703 and 1705 have the same TB or different TBs are as follows. When the two DCIs have the same HARQ process number and NDI value, the UE determines that the two PDSCHs have the same TB. If at least one of the two has a different value, the UE determines that the two PDSCHs have different TBs. The HARQ process number and NDI are merely examples, and the DCI fields described above, such as a time resource allocation field or a frequency resource allocation field, may be replaced and applied.

As another example, when all or part of the time and frequency resource domains of PDSCHs indicated by two DCIs respectively overlap, the UE may determine that the TBs included in the scheduled PDSCHs are the same TB. As another example, when two DCIs indicate the same counter DAI or total DAI values, the UE may determine that TBs included in scheduled PDSCHs are the same TB. The above operation is specified in the standard and is always applied or may be limitedly applied only when activated by a specific UE capability report or higher signal configuration.

Repeated transmission of the same PDSCH of 1700 is only an example, and repeated transmission of PDSCH may be transmitted using different OFDM symbols in one slot or in different slots. In addition, it is also possible that one PDSCH is transmitted over different slots. The multiple DCI-based multiple TRP-based same PDSCH repeated transmission may be supported in a form having the same slot-based same symbol as described above in FIG. 10 or in a form having different symbols within a slot (or between slots) as described above in FIGS. 13 to 15. This transmission may be configured by a higher signal or an L1 signal.

As described above in FIG. 9, a case in which a specific resource area is not used for scheduled PDSCH transmission by a higher signal or an L1 signal may occur in FIG. 17 as well, and it may be possible to determine the PDSCH mapping assumed by the base station and the UE by at least one of the following four methods.

Method 1: The method 1 is that the RB-symbol level rate matching pattern or the RE level rate matching pattern described above in FIG. 9 is applied to all of the repeated PDSCH transmissions transmitted through different TRPs. That is, the method 1 is characterized in that rate matching information corresponding to a specific TRP or rate matching information indicated by DCI transmitted in a specific TRP is also applied to a PDSCH transmitted in another TRP.

As an example, in a situation in which the same PDSCH is repeatedly transmitted from different TRPs such as 1700, 1720 illustrates an example in which the specific resource area 1735 indicated by the rate matching indicator field of the DCI 1723 transmitted and received in TRP 1 is not used for the same PDSCH repeated transmissions 1730 and 1732. Alternatively, when the base station informs the UE that the resource area 1735 is not used for PDSCH transmission through a higher signal in advance, the UE may determine that the specific resource area 1735 is not used for repeated transmission of the same PDSCH 1730 and 1732. Although the method of applying the rate matching pattern in the repeated PDSCH transmission has been described in consideration of the same PDSCH repeated transmission situation, it is sufficiently applicable to the transmission situation of different PDSCHs other than the same PDSCH.

In addition, the example of 1720 is an example of a situation in which only one DCI 1723 indicates a rate matching resource including rate matching indicator information, if other DCI 1725 also includes rate matching indicator information, the UE determines that the union of resources indicated by rate matching indicator information transmitted from different DCIs 1723 and 1725 is not used for PDSCH transmissions 1730 and 1732.

That is, regardless of whether the TCI state of the PDCCH to which the DCI 1723 including the rate matching indicator field belongs is the same as or different from the TCI states of the PDSCHs 1730 and 1732, the UE determines that the specific resource area 1735 indicated by the rate matching indicator overlapping the PDSCHs 1730 and 1732 is not used for the PDSCHs 1730 and 1732.

Even if the TRPs in which the PDSCH is repeatedly transmitted are physically located in different places, the same time and frequency resource areas may be used, so it may be advantageous for a rate matching pattern to be commonly applied to all TRPs according to the method 1 to minimize interference to a UE using LTE or other NR services for other purposes.

Method 2: The method 2 is that the RB-symbol rate matching pattern or RE level rate matching pattern described above in FIG. 9 is limitedly applied to PDSCHs transmitted from a specific TRP among repeated PDSCH transmissions transmitted through different TRPs. That is, the method 2 is characterized in that rate matching information corresponding to a specific TRP or rate matching information indicated by DCI transmitted in a specific TRP is limitedly applied to the PDSCH transmitted only in the specific TRP.

In a situation in which the same PDSCH is repeatedly transmitted from different TRPs by different DCIs 1743 and 1745 such as 1700, although the base station informs the UE that the specific resource areas 1754 and 1756 are not used for PDSCH transmission through the rate matching indicator field included in the DCI 1743 transmitted from TRP 1, in actual PDSCH transmission, 1740 illustrates that only a specific resource area 1754 overlapping with the resource area of the PDSCH transmitted in TRP 1 is not used for the PDSCH 1750 transmission, but another specific resource area 1756 which overlaps with the transmitted PDSCH 1752 is used for PDSCH transmission in TRP 2.

Alternatively, in a situation where there is no rate matching indicator field in the DCI 1743, but the specific resource areas 1754 and 1756 are given by the higher signal configuration associated with TRP 1, when the PDSCH overlaps with the specific resource areas 1754 and 1756 only for the PDSCH transmitted from TRP 1, the overlapping PDSCH resource area is not used for PDSCH transmission. In other words, for PDSCHs transmitted in a TRP other than TRP 1, even if the PDSCH overlaps the specific resource areas 1754 and 1756, the specific resource areas are used for PDSCH transmission.

The method 2 is advantageous in that the rate matching pattern may be limitedly applied only to the PDSCH transmitted by the specific TRP in order to minimize interference to the UE using LTE or other NR services only where the TRP is located.

When the method 2 is viewed from the viewpoint of the TCI state, if the TCI state of the PDCCH to which the DCI 1743 including the rate matching indicator field belongs is the same as the TCI state of the corresponding PDSCH 1750, the UE determines that the resource area indicated by the rate matching information (information that a specific resource area is not used for PDSCH transmission and reception) 1754 exist in the DCI is not used for the PDSCH 1750 transmission. If the TCI state of the PDCCH to which the DCI 1743 including the rate matching indicator field belongs is different from the TCI state of the corresponding PDSCH 1752, the UE determines that the resource area 1756 indicated by the rate matching information exist in the DCI is used for the PDSCH 1752 transmission.

Alternatively, if a rate-matching resource area configured with a higher signal is associated with a specific one or a plurality of TCI state values, the UE determines whether the TCI state of PDSCH scheduled by DCI based on the higher signal information (without the need to check the TCI state information of the PDCCH to which the received DCI belongs) is the same as (or belongs to) or different from (or does not belong to) the TCI state for rate matching information configured through the higher signal. If the TCI states are the same, the UE does not use a rate-matched resource in the scheduled PDSCH resource area for PDSCH reception. If the TCI states are different, the UE uses a rate-matched resource in the scheduled PDSCH resource area for PDSCH reception.

The determination of the TCI state associated with the DCI is determined by the TCI state in the CORESET higher signal information for the PDCCH to which the DCI belongs, as illustrated in Table 4. The determination of the TCI state associated with the PDSCH is determined by the transmission configuration indication field in the DCI for scheduling the PDSCH. When repeated PDSCH transmission in a plurality of TRPs is scheduled by one DCI, one or more values of different TCI states for each repeatedly transmitted PDSCH are determined by the transmission configuration indication field. For example, when the transmission configuration indication field is 3 bits, a total of 8 indexes may indicate different TCI state(s), and a specific index among 8 indexes may indicate two or more TCI states.

Method 3: The method 3 is basically similar to the method 1, but has the following differences. The method 3 is the same as the method 1 in that the specific resource area 1735 is not used for PDSCH transmission in an example of 1720, the base station maps data information to the scheduled PDSCH resource areas 1730 and 1732 including the specific resource area, and then punctures the specific resource area 1735 and transmits the scheduled PDSCH resource areas. In the case of the method 1, the specific resource area 1735 indicated by the "rate matching indicator" field is not used for PDSCH 1730 and 1732 transmissions, which means that when the base station transmits the PDSCH to the UE, the downlink data is mapped to valid resources excluding the corresponding resource area.

The reason for using this method is that, according to the method 1, when the UE misses (or it may be understood as not receiving or not being able to decode) one of the two DCIs, the base station and the UE have different understandings for the PDSCH mapping method. When the UE receives the DCI 1725 for scheduling the PDSCH 1732 and does not receive the DCI 1723 including the rate matching indicator field, the UE determines that data is mapped to the scheduled PDSCH 1732 without specific resource area 1735 information indicated by the rate matching indicator field and will attempt to receive the PDSCH. On the other hand, the base station will transmit data by mapping data to the remaining scheduled PDSCH 1732 resource areas except for the specific resource area 1735 indicated by the rate matching indicator field. Accordingly, because the base station and the UE have different understanding of transmission and reception, the UE will fail to demodulate/decode the PDSCH 1732.

In order to alleviate the problem, although the base station does not perform data transmission in the specific resource area 1735, if the base station assumes that data is transmitted and takes a method of frequency-priority mapping data (that is, the base station performs puncturing), although the UE determines that the PDSCH is received up to the specific resource area 1735, if the corresponding portion is small in the entire scheduled area, data decoding may be successful. Schematically, it is as illustrated in 1760. When the UE receives scheduled PDSCH and information that a specific resource area 1766 is not used for the corresponding PDSCH transmission, the method 1 is to sequentially map the data except for the area 1766 as in 1764, and in the method 3, the base station maps information including the corresponding area 1766 as in 1762, but the actual transmission is performed except for 1766.

Method 4: The method 4 is a combination of the method 1 (or the method 3) and the method 2, in which two types of specific resource areas (rate matching resources) not used for transmission and reception of PDSCH exist. The first is a rate matching resource commonly applied to all TCI states (or all TRPs) (type A RM resource), and the second is a rate matching resource limitedly applied to a specific TCI state (or a specific TRP) (type B RM resource).

The base station may indicate the type A and type B RM resources through a higher signal, or dynamically inform whether the type A and type B RM resources are used for PDSCH transmission/reception by the L1 signal (DCI) after configuring the higher signal. When configured by only the higher signal, the UE applies the method 1 (or the method 3) or the method to a resource for which PDSCH repeated transmission/reception (or single transmission/reception) is performed depending on whether the rate matching resource type is type A or type B. That is, the UE performs the method 1 (or the method 3) if it is a type A RM resource, and performs the method 2 if it is a type B RM resource. When indicated by the higher signal and the L1 signal, the UE finally applies the method 1 (or the method 3) or the method 2 depending on whether the rate matching resource type indicated by the L1 signal is type A or type B. That is, the UE performs the method 1 (or the method 3) if it is type A, and performs the method 2 if it is type B.

When the base station repeatedly transmits the PDSCH in multiple TRPs through the method 1, 2, 3, or to 4 described above, the base station informs the UE whether or not a specific resource area is used for the PDSCH transmission with a higher signal or an L1 signal, and the UE performs PDSCH reception therethrough. Specifically, the base station and the UE may transmit and receive data by at least one of the following cases.

Case 1: As an example, one of the methods described above is specified in the 3GPP standard, and the base station and the UE always perform the above operation.

Case 2: The base station informs the UE of at least one of the methods 1 to 4 with a higher signal, and the UE follows the method configured through the higher signal. As an example, the PDSCH scheduled by the fallback DCI format always applies a specific method because the PDSCH scheduled by the fallback DCI format is not affected by the higher signal configuration change, and the PDSCH scheduled by the non-fallback DCI format applies one of the method 1, 2, 3, or 4 according to the higher signal configuration. Alternatively, the base station informs the UE whether or not a specific method is applied when configuring the CORESET or search space higher signal. In addition, the UE determines which method is applied according to the CORESET or search space configuration including the DCI scheduling the PDSCH. Alternatively, after a method specified in the 3GPP standard or configured as a default, or for each RNTI as a higher signal is configured, the method specified or configured according to the RNTI scrambled in the CRC of the DCI may be applied to the PDSCH scheduled by the DCI.

Case 3: A field indicating the use (or, selection or not selection) of a specific method is included in DCI, so that the base station and the UE perform PDSCH transmission/reception according to the corresponding information.

Case 4: As described above with reference to FIG. 9, the rate matching information is largely divided into information configured only with a higher signal and information dynamically selected by the DCI field after being configured with a higher signal. Accordingly, the UE uses the method 1 (or the method 3) for rate matching pattern information configured only with the higher signal, and the method 2 for rate matching information that may be selected by the higher signal and DCI.

Case 5: A method of repeated transmission of the same TB PDSCH transmitted in multiple TRPs may be a TDM scheme in which PDSCHs have different time resources, FDM scheme in which PDSCHs have different frequency resources, or each PDSCH has the same time and frequency resources but different layers. In this situation, if the PDSCHs transmitted in multiple TRPs have the same time and frequency resources, the method 1 (or the method 3) may be applied, and if time or frequency resources are different, the method 2 may be applied.

Applying the method to the PDSCH refers to that the UE and the base station determine whether to use the rate matching information for transmission and reception of the PDSCH according to the method described above. In FIG. 17, a method of applying a rate matching pattern when repeated transmission of the same PDSCH is transmitted and received through different symbols within one slot by multiple DCI has been mainly described. The same method may be applied when repeated transmission of the same PDSCH is transmitted/received to/from another layer through the same time and/or frequency resource.

Figure 18:
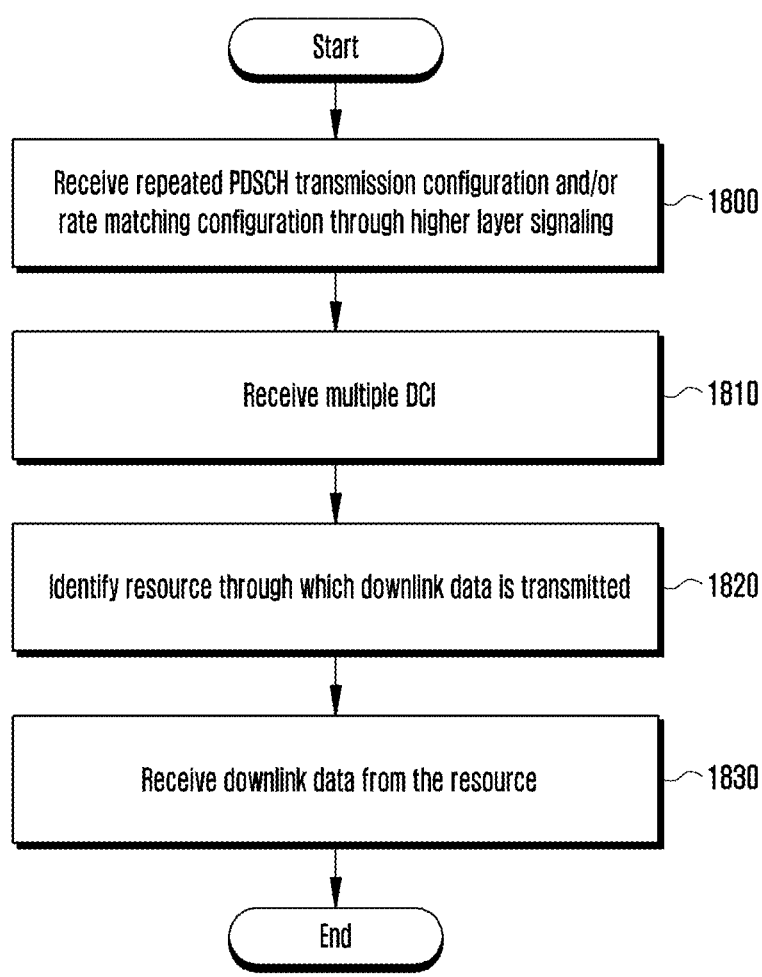
FIG. 18 is a diagram illustrating an operation of a UE performing the second embodiment.

FIG. 18 is a diagram illustrating an operation of a UE performing the second embodiment. According to FIG. 18, the UE receives repeated PDSCH transmission configuration information and/or rate matching resource configuration information through higher layer signaling. In addition, configuration information on the TCI state and configuration information related to PDCCH may also be received through higher layer signaling 1800. The UE receives multiple DCIs for cooperative communication 1510. The multiple DCIs may be determined to be for cooperative communication by the method described above, and may have one the structure of the case #1 to case #3 described in FIG. 12.

The UE identifies a resource through which downlink data is received 1820. Specifically, the UE may identify the resource on which the PDSCH (downlink data) is scheduled for each TCI state using the single DCI, and may identify a resource on which PDSCH rate matching is performed among the resources in which the PDSCH is scheduled based on rate matching information determined through higher layer signaling and/or information such as a rate matching indicator and/or TCI state included in a single DCI using one of the methods described above. The UE identifies that downlink data is received from resources other than a resource for which rate matching is performed among resources on which the PDSCH is scheduled. Thereafter, the UE receives downlink data from a resource through which the identified downlink data is transmitted 1830. Each of the steps described above may be omitted, and the order may be changed and performed.

Figure 19:
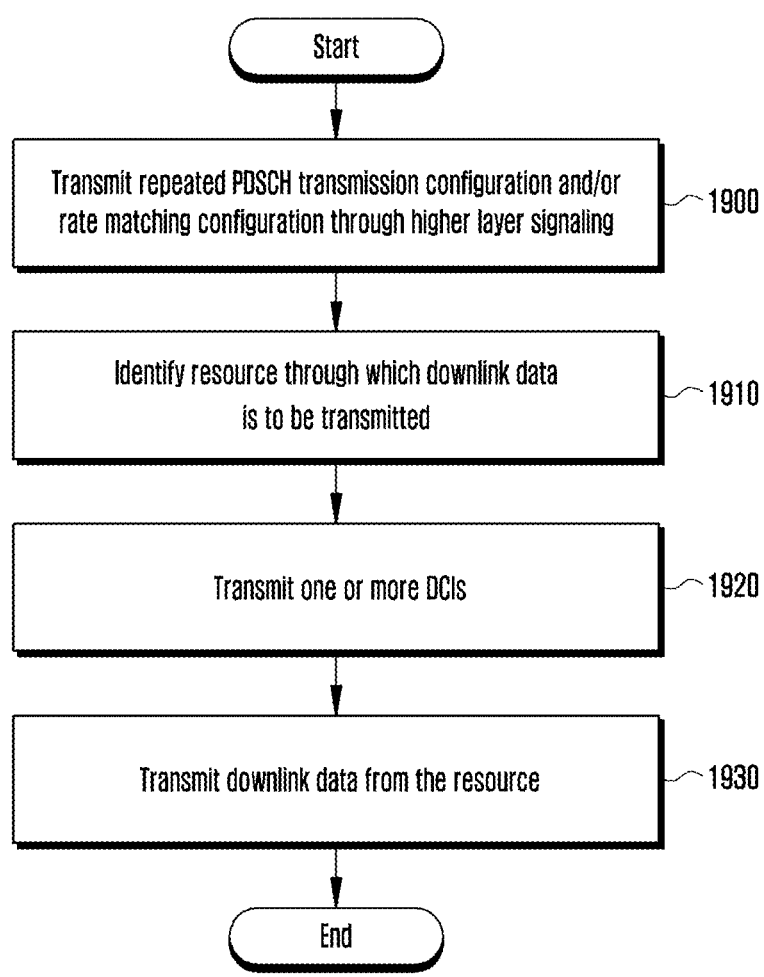
FIG. 19 is a diagram illustrating an operation of a base station performing the second embodiment.

FIG. 19 is a diagram illustrating an operation of a base station performing the second embodiment. According to FIG. 19, the base station transmits repeated PDSCH transmission configuration information and/or rate matching resource configuration information through higher layer signaling. In addition, configuration information on the TCI state and configuration information related to PDCCH may also be transmitted through higher layer signaling 1900. The base station may identify a resource for transmitting downlink data 1910 and generate one or more DCIs for cooperative communication based on a result of the identification. In this case, the one or more DCIs may include information indicating a resource on which the PDSCH (downlink data) is scheduled, and rate matching indicator and/or TCI state information may be included based on the identification result. The base station transmits one or more DCIs 1920. The one or more DCIs may have a structure of nDCI or sDCI illustrated in one of cases #1 to #3 described in FIG. 12. Thereafter, the base station transmits downlink data from a resource through which the downlink data is transmitted 1930. Any of the steps described above may be omitted, and the order may be changed and performed.

Figure 20:
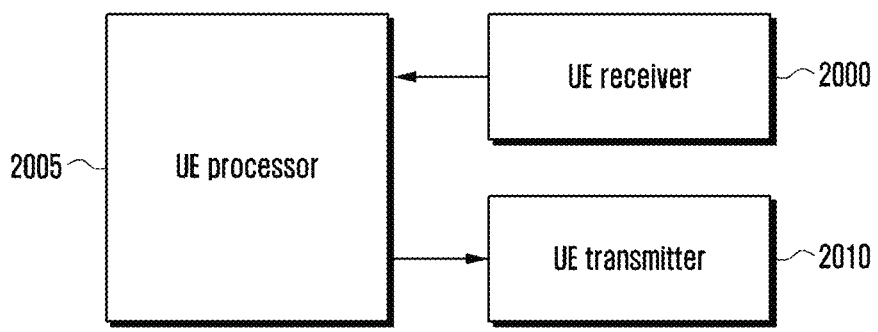
FIG. 20 is a diagram illustrating a structure of a UE in a wireless communication system according to an embodiment of the disclosure.

FIG. 20 is a diagram illustrating a structure of a UE in a wireless communication system according to an embodiment of the disclosure.

Referring to FIG. 20, the UE may include a transceiver 2000, a memory 2005, and a processor 2010. According to the communication method of the UE described above, the transceiver 2000 and the processor 2010 of the UE may operate. However, the components of the UE are not limited to the above-described examples. For example, the UE may include more or fewer components than the aforementioned components. In addition, the transceiver 2000, the memory 2005, and the processor 2010 may be implemented in the form of a single chip.

The transceiver 2000 may transmit/receive a signal to/from the base station. The signal may include control information and data. To this end, the transceiver 2000 may include an RF transmitter for up-converting and amplifying a frequency of a transmitted signal, and an RF receiver for low-noise amplifying and down-converting a received signal. However, this is only an embodiment of the transceiver 2000, and components of the transceiver 2000 are not limited to the RF transmitter and the RF receiver.

In addition, the transceiver 2000 may receive a signal through a wireless channel and output the signal to the processor 2010, and transmit the signal output from the processor 2010 through a wireless channel.

The memory 2005 may store programs and data necessary for the operation of the UE. In addition, the memory 2005 may store control information or data included in a signal transmitted and received by the UE. The memory 2005 may be configured as a storage medium or a combination of storage media, such as ROM, RAM, hard disk, CD-ROM, and DVD. In addition, the number of memories 2005 may be plural.

In addition, the processor 2010 may control a series of processes so that the UE can operate according to the above-described embodiment. For example, the processor 2010 may receive DCI composed of two layers and control the components of the UE to receive a plurality of PDSCHs at the same time. The number of processors 2010 may be plural, and the processor 2010 may perform a component control operation of the UE by executing a program stored in the memory 2005.

Figure 21:
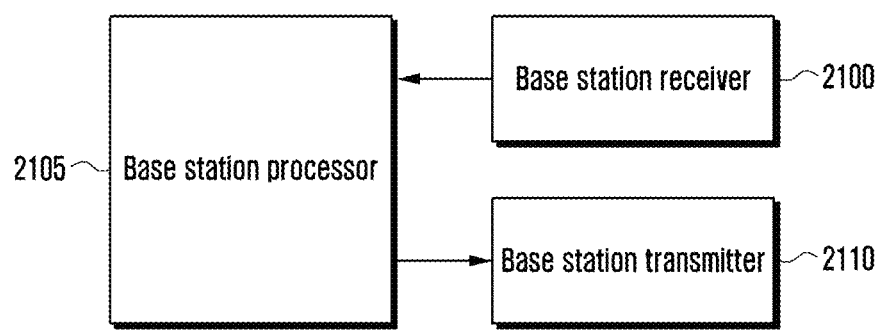
FIG. 21 is a diagram illustrating a structure of a base station in a wireless communication system according to an embodiment of the disclosure.

FIG. 21 is a diagram illustrating a structure of a base station in a wireless communication system according to an embodiment of the disclosure.

Referring to FIG. 21, the base station may include a transceiver 2100, a memory 2105, and a processor 2110. According to the communication method of the base station described above, the transceiver 2100 and the processor 2110 of the base station may operate. However, the components of the base station are not limited to the above-described examples. For example, the base station may include more or fewer components than the aforementioned components. In addition, the transceiver 2100, the memory 2105, and the processor 2110 may be implemented in the form of a single chip.

The transceiver 2100 may transmit/receive a signal to/from the UE. The signal may include control information and data. To this end, the transceiver 2100 may include an RF transmitter for up-converting and amplifying a frequency of a transmitted signal, and an RF receiver for low-noise amplifying and down-converting a received signal. However, this is only an embodiment of the transceiver 2100, and components of the transceiver 2100 are not limited to the RF transmitter and the RF receiver.

In addition, the transceiver 2100 may receive a signal through a wireless channel and output the signal to the processor 2110, and transmit the signal output from the processor 2110 through a wireless channel.

The memory 2105 may store programs and data necessary for the operation of the base station. In addition, the memory 2105 may store control information or data included in a signal transmitted and received by the base station. The memory 2105 may be configured as a storage medium or a combination of storage media, such as ROM, RAM, hard disk, CD-ROM, and DVD. In addition, the number of memories 2005 may be plural.

The processor 2110 may control a series of processes so that the UE can operate according to the above-described embodiment. For example, the processor 2110 may control each component of the base station to configure two-layer DCIs including allocation information for a plurality of PDSCHs and transmit the two-layer DCIs. The number of processors 2110 may be plural, and the processor 2110 may perform a component control operation of the base station by executing a program stored in the memory 2105.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Further, although the above embodiments have been described based on FDD LTE systems, other variants based on the technical idea of the embodiments may also be implemented in other systems such as TDD LTE, 5G, or NR systems.

The invention claimed is:

1. A method performed by a terminal in a communication system, the method comprising:
receiving first rate matching resource information and second rate matching resource information via higher layer signaling, the first rate matching resource information and the second rate matching resource information being associated with a cell-specific reference signal (CRS);
in case that a first scheme for a rate matching is performed based on information indicating the first scheme for the rate matching is to be performed being received from a base station:
receiving a first physical downlink shared channel (PDSCH) or a second PDSCH,
wherein a resource indicated by the first rate matching resource information is not used to receive the first PDSCH, and a resource indicated by the second rate matching resource information is not used to receive the second PDSCH; and
in case that a second scheme of the rate matching is to be performed:
receiving a PDSCH, wherein the resources indicated by the first rate matching resource information and the second rate matching resource information are not used to receive the PDSCH.

2. The method of claim 1, wherein the first PDSCH is associated with an index corresponding to a first transmission and reception point (TRP) configured via higher layer signaling, and the second PDSCH is associated with an index corresponding to a second TRP configured via higher layer signaling.

3. The method of claim 1, wherein each of the first rate matching resource information and the second rate matching resource information includes at least one of a CRS v-shift value, a number of CRS antenna ports, or frequency location information.

4. The method of claim 1, wherein the information indicating the first scheme for the rate matching is to be performed is received via higher layer signaling.

5. A method performed by a base station in a communication system, the method comprising:
transmitting first rate matching resource information and second rate matching resource information via higher layer signaling, the first rate matching resource information and the second rate matching resource information being associated with a cell-specific reference signal (CRS);
in case that information indicating a first scheme for a rate matching is to be performed is transmitted and the first scheme for the rate matching is performed:
transmitting a first physical downlink shared channel (PDSCH) in a resource excluding the resource indicated by the first rate matching resource information; or
transmitting a second PDSCH in a resource excluding the resource indicated by the second rate matching resource information; and
in case that a second scheme for the rate matching is to be performed:
transmitting a PDSCH in a resource excluding the resources indicated by the first rate matching resource information and the second rate matching resource information.

6. The method of claim 5, wherein the first PDSCH is associated with an index corresponding to a first transmission and reception point (TRP) configured via higher layer signaling, and the second PDSCH is associated with an index corresponding to a second TRP configured via higher layer signaling.

7. The method of claim 5, wherein the first rate matching resource information and the second rate matching resource information includes at least one of a CRS v-shift value, a number of CRS antenna ports, or frequency location information.

8. The method of claim 5, wherein the information indicating the first scheme for the rate matching is to be performed is transmitted via higher layer signaling.

9. A terminal in a communication system, the terminal comprising:
a transceiver; and
a controller configured to:
receive first rate matching resource information and second rate matching resource information via higher layer signaling, the first rate matching resource information and the second rate matching resource information being associated with a cell-specific reference signal (CRS), and
in case that a first scheme for a rate matching is performed based on information indicating the first scheme for the rate matching is to be performed being received from a base station:
receive a first physical downlink shared channel (PDSCH) or a second PDSCH, wherein a resource indicated by the first rate matching resource information is not used to receive the first PDSCH, and a resource indicated by the second rate matching resource information is not used to receive the second PDSCH, and
in case that a second scheme of the rate matching is to be performed:
receive a PDSCH, wherein the resources indicated by the first rate matching resource information and the second rate matching resource information are not used to receive the PDSCH.

10. The terminal of claim 9, wherein the first PDSCH is associated with an index corresponding to a first transmission and reception point (TRP) configured via higher layer signaling, and the second PDSCH is associated with an index corresponding to a second TRP configured via higher layer signaling.

11. The terminal of claim 9, wherein the first rate matching resource information and the second rate matching resource information includes at least one of a CRS v-shift value, a number of CRS antenna ports, or frequency location information.

12. The terminal of claim 9, wherein the information indicating the first scheme for the rate matching is to be performed is received via higher layer signaling.

13. A base station in a communication system, the base station comprising:
a transceiver; and
a controller configured to:
transmit first rate matching resource information and second rate matching resource information via higher layer signaling, the first rate matching resource information and the second rate matching resource information being associated with a cell-specific reference signal (CRS),
in case that information indicating a first scheme for a rate matching is to be performed is transmitted and the first scheme for the rate matching is performed:
transmit a first physical downlink shared channel (PDSCH) in a resource excluding the resource indicated by the first rate matching resource information or transmit a second PDSCH in a resource excluding the resource indicated by the second rate matching resource information, and in case that a second scheme for the rate matching is to be performed:
transmit a PDSCH in a resource excluding the resources indicated by the first rate matching resource information and the second rate matching resource information.

14. The base station of claim 13, wherein the first PDSCH is associated with an index corresponding to a first transmission and reception point (TRP) configured via higher layer signaling, and the second PDSCH is associated with an index corresponding to a second transmission and reception point (TRP) configured via higher layer signaling.

15. The base station of claim 13, wherein the first rate matching resource information and the second rate matching resource information includes at least one of a CRS v-shift value, a number of CRS antenna ports, or frequency location information.

16. The base station of claim 13, wherein the information indicating the first scheme for the rate matching is to be performed is transmitted via higher layer signaling.

* * * * *